US011442661B2

(12) United States Patent
Kotzur et al.

(10) Patent No.: US 11,442,661 B2
(45) Date of Patent: Sep. 13, 2022

(54) RAID PARITY DATA GENERATION OFFLOAD SYSTEM

(71) Applicant: Dell Products L.P., Round Rock, TX (US)

(72) Inventors: Gary Benedict Kotzur, Austin, TX (US); William Emmett Lynn, Round Rock, TX (US); Kevin Thomas Marks, Georgetown, TX (US); Chandrashekar Nelogal, Round Rock, TX (US); James Peter Giannoules, Round Rock, TX (US); Austin Patrick Bolen, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 350 days.

(21) Appl. No.: 16/838,764

(22) Filed: Apr. 2, 2020

(65) Prior Publication Data

US 2021/0311661 A1    Oct. 7, 2021

(51) Int. Cl.
  *G06F 11/10* (2006.01)
  *G06F 3/06* (2006.01)
(52) U.S. Cl.
  CPC .......... *G06F 3/0659* (2013.01); *G06F 3/0607* (2013.01); *G06F 3/0619* (2013.01); *G06F 3/0658* (2013.01); *G06F 3/0689* (2013.01); *G06F 11/1076* (2013.01)
(58) Field of Classification Search
  CPC .... G06F 11/1076; G06F 11/108; G06F 3/065; G06F 3/0619; G06F 3/0607; G06F 3/0689; G06F 3/0659; G06F 3/0658
  See application file for complete search history.

(56) References Cited

U.S. PATENT DOCUMENTS

| | | | | |
|---|---|---|---|---|
| 8,065,481 B1* | 11/2011 | Hiller | ..................... | G06F 3/0611 714/6.21 |
| 2014/0304461 A1* | 10/2014 | Kitahara | ............... | G06F 3/0604 711/103 |
| 2016/0291866 A1 | 10/2016 | Olcay et al. | | |

OTHER PUBLICATIONS

Tallis, Billy; "NVMe 1.4 Specification Published: Further Optimizing Performance and Reliability", AnandTech, nvm Express, Jun. 14, 2019, 7pp.

* cited by examiner

*Primary Examiner* — Ernest Unelus
(74) *Attorney, Agent, or Firm* — Joseph Mencher

(57) ABSTRACT

A RAID parity data generation offload system includes a RAID storage controller device that determines that a RAID parity data storage device loading for a RAID parity data storage device exceeds a loading threshold, and then generates and transmits a RAID parity data generation offload command associated with a RAID parity data update required in response to a RAID primary data update. A first RAID primary data storage device receives the RAID parity data generation offload command, and then retrieves current parity data from the RAID parity data storage device, and performs an XOR operation using the current parity data, current primary data, and updated primary data associated with the RAID primary data update in order to generate updated parity data. The first RAID primary data storage device then provides the updated parity data for storage on the RAID parity data storage device in place of the current parity data.

20 Claims, 29 Drawing Sheets

|  | ENTERPRISE RAID DATA STORAGE DEVICE 504 | | | DATACENTER RAID DATA STORAGE DEVICE 506 | |
|---|---|---|---|---|---|
|  | WRITE INTENSIVE 504a | MIXED USE 504b | READ INTENSIVE 504c | MIXED USE 506a | READ INTENSIVE 506b |
| SEQUENTIAL READ 508 (@64KB) | 20 | 20 | 20 | 40 | 50 |
| SEQUENTIAL WRITE 510 (@64KB) | 25 | 35 | 70 | 70 | 80 |
| RANDOM READ 512 (@4KB) | 2 | 2 | 2 | 5 | 10 |
| RANDOM WRITE 514 (@4KB) | 3 | 7 | 13 | 20 | 35 |

RAID STORAGE CONTROLLER DATABASE 500

FIG. 5A

| COMMAND 518 | DESCRIPTION 520 | RAID DATA STORAGE DEVICE 206a | RAID DATA STORAGE DEVICE 206b | RAID DATA STORAGE DEVICE 206c | RAID DATA STORAGE DEVICE 206d |
|---|---|---|---|---|---|
|  |  |  |  |  |  |
|  |  |  |  |  |  |
|  |  |  |  |  |  |
| TOTAL 522 |  |  |  |  |  |

RAID STORAGE CONTROLLER DATABASE 500

FIG. 5B

| COMMAND 518 | DESCRIPTION 520 | RAID DATA STORAGE DEVICE 206a | RAID DATA STORAGE DEVICE 206b | RAID DATA STORAGE DEVICE 206c | RAID DATA STORAGE DEVICE 206d |
|---|---|---|---|---|---|
| COMMAND 0 (Rd, Addr, 4KB) | RnRd @ 206b (2x1) | | 2 | | |
| COMMAND 1 (Rd, Addr, 256KB) | SqRd @ 206a, 206b, 206d, 206d (20 each) | 20 | 20 | 20 | 20 |
| COMMAND 2 (Wr, Addr, 16KB) | RnWr @ 206c (7x4) | | | 28 | |
| COMMAND 3 (Wr, Addr, 128KB) | SqWr @ 206b, 206c (35 each) | | | 35 | 35 |
| COMMAND 4 (Rd, Addr, 2KB) | RnRd @ 206d 2/2 | | | | 1 |
| TOTAL 522 | | 20 | 22 | 83 | 56 |

RAID STORAGE CONTROLLER DATABASE 500

FIG. 10

| COMMAND | DESCRIPTION | RAID STORAGE DEVICE 206a | RAID STORAGE DEVICE 206b | RAID STORAGE DEVICE 206c | RAID STORAGE DEVICE 206d |
|---|---|---|---|---|---|
| COMMAND 50 (Wr, Addr, 8KB) | RnWr @ 206a (2x7) | 14 | | | |
| COMMAND 51 (Wr, Addr, 128KB) | SqRd @ 206b, 206c (35 each) | 35 | | | 35 |
| COMMAND 52 (Rd, Addr, 4KB) | RnRd @ 206c (2x1) | | | | 2 |
| COMMAND 53 (Rd, Addr, 256KB) | SqRd @ 206a, 206b, 206c, 206d (20 each) | 20 | 20 | 20 | 20 |
| COMMAND 54 (Rd, Addr, 1KB) | RnRd @ 206a 2/4 | | 20 | 0.5 | |
| TOTAL 522 | | 69 | 20 | 20.5 | 57 |

RAID DATA STORAGE DATABASE 500

FIG. 12

RAID PARITY DATA GENERATION OFFLOAD SYSTEM

BACKGROUND

The present disclosure relates generally to information handling systems, and more particularly to offloading the generation of parity data from a RAID parity data storage device in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems sometime utilize storage systems such as those provided by a Redundant Array of Independent Disks (RAID) data storage system that includes a plurality of RAID data storage devices. As will be appreciated by one of skill in the art, RAID data storage systems are provided by a data storage virtualization technology that combines the physical RAID data storage devices into one or more logical storage units for the purposes of data redundancy, performance improvements, and/or other benefits known in the art. For example, data in a RAID data storage system may be distributed across the RAID data storage devices using several different techniques that are referred to as "RAID levels" that provide different levels of redundancy and performance (e.g., RAID 0, RAID 1, RAID 5, RAID 6, and so on), with each RAID level providing a different balance among goals that include reliability, availability, performance, and capacity.

The introduction of new storage technologies for use in RAID data storage systems has provided for performance and efficiency improvements in RAID data storage systems. For example, Non-Volatile Memory express (NVMe) storage devices (e.g., NVMe Solid State Drive (SSD) drives) utilize an open logical device interface specification for accessing its non-volatile storage media (e.g., provided by NAND flash memory devices) via a Peripheral Component Interconnect express (PCIe) bus to provide low latency, internal parallelism, and/or other benefits known in the art, and have begun to be implemented as the RAID data storage devices discussed above in order to assist in data update operations for the RAID data storage system. The inventors of the present disclosure describe some techniques for performing RAID storage-device-assisted data updates in U.S. patent application Ser. No. 16/586,445, filed on Sep. 27, 2019, and those RAID data storage systems may utilize NVMe storage devices to perform some or all of the data update operations that are traditionally performed by a RAID storage controller device in the RAID data storage system.

As discussed in further detail below, the inventors of the present disclosure have discovered techniques for leveraging the storage-device-assisted data update functionality discussed above in additional manners that increase the efficiency of RAID data storage systems such as, for example, when a RAID data storage device in a RAID data storage system becomes overloaded relative to other RAID data storage devices in that RAID data storage system (or other RAID data storage systems coupled to that RAID data storage system.) However, conventional techniques for identifying relative loading of RAID data storage devices suffer from a number of deficiencies. For example, a conventional RAID data storage device loading determination technique involves determining a "queue depth" for each RAID data storage device (e.g., the number of commands in a submission queue of that RAID data storage device.) However, different commands included in a submission queue of a RAID data storage device may require different amounts of time to execute, and thus such conventional load determination techniques for RAID data storage devices do not provide a very accurate means for identifying the load on a RAID data storage device, or the relative loading between RAID data storage devices in a RAID data storage system (or across RAID data storage systems.)

Accordingly, it would be desirable to provide a RAID data storage system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a RAID data storage engine that is configured to: receive, from a RAID storage controller device, a RAID parity data generation offload command that is associated with a RAID parity data storage device having a RAID parity data storage device loading that exceeds a loading threshold; retrieve, from the RAID parity data storage device, current parity data; perform an XOR operation using the current parity data, current primary data, and updated primary data associated with the RAID primary data update in order to generate updated parity data; and provide the updated parity data for storage on the RAID parity data storage device in place of the current parity data.

BRIEF DESCRIPTION OF THE DRAWINGS

FIG. 5A is a schematic view illustrating an embodiment of a RAID storage controller database that may be provided in the RAID storage controller device of FIG. 4.

FIG. 5B is a schematic view illustrating an embodiment of a RAID storage controller database that may be provided in the RAID storage controller device of FIG. 4.

FIG. 10 is a schematic view illustrating an embodiment of the RAID storage controller database of FIG. 5B operating during the method of FIG. 6.

FIG. 12 is a schematic view illustrating an embodiment of the RAID storage controller database of FIG. 5B operating during the method of FIG. 6.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
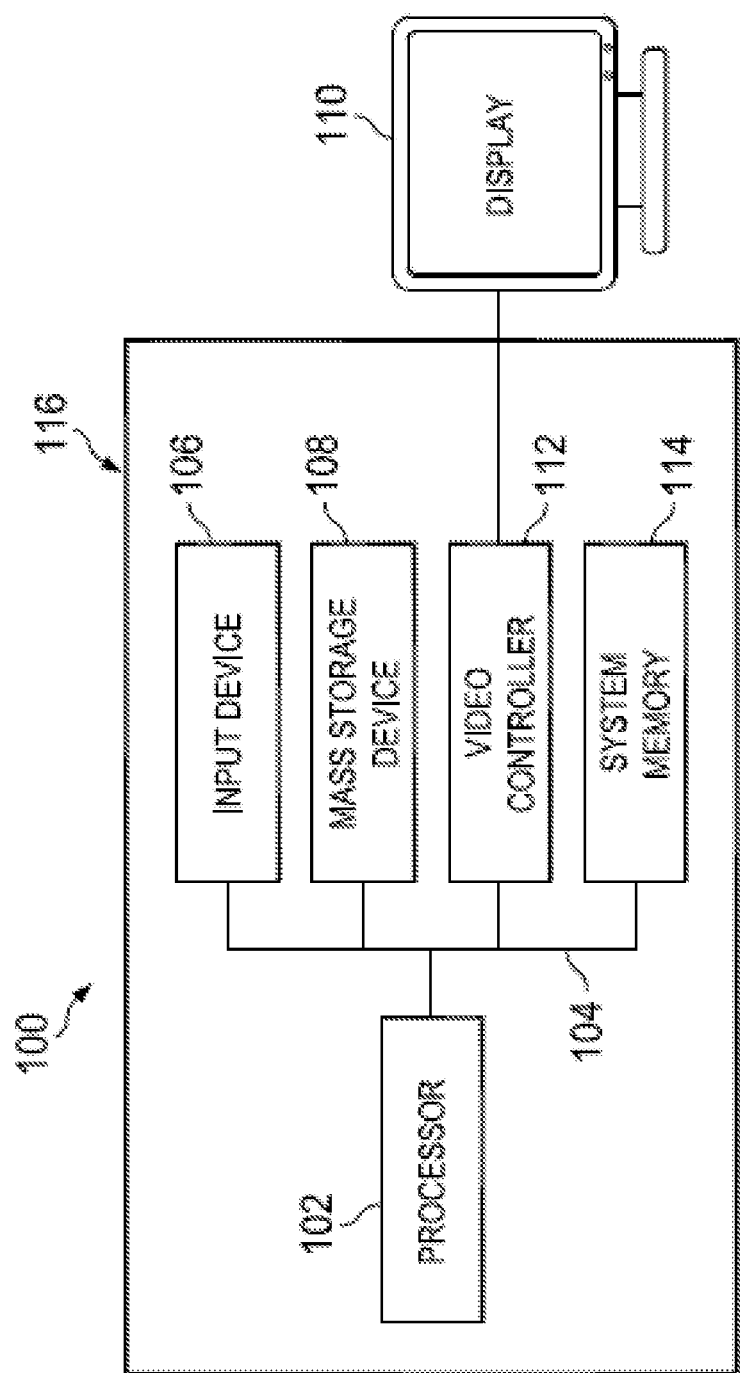
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
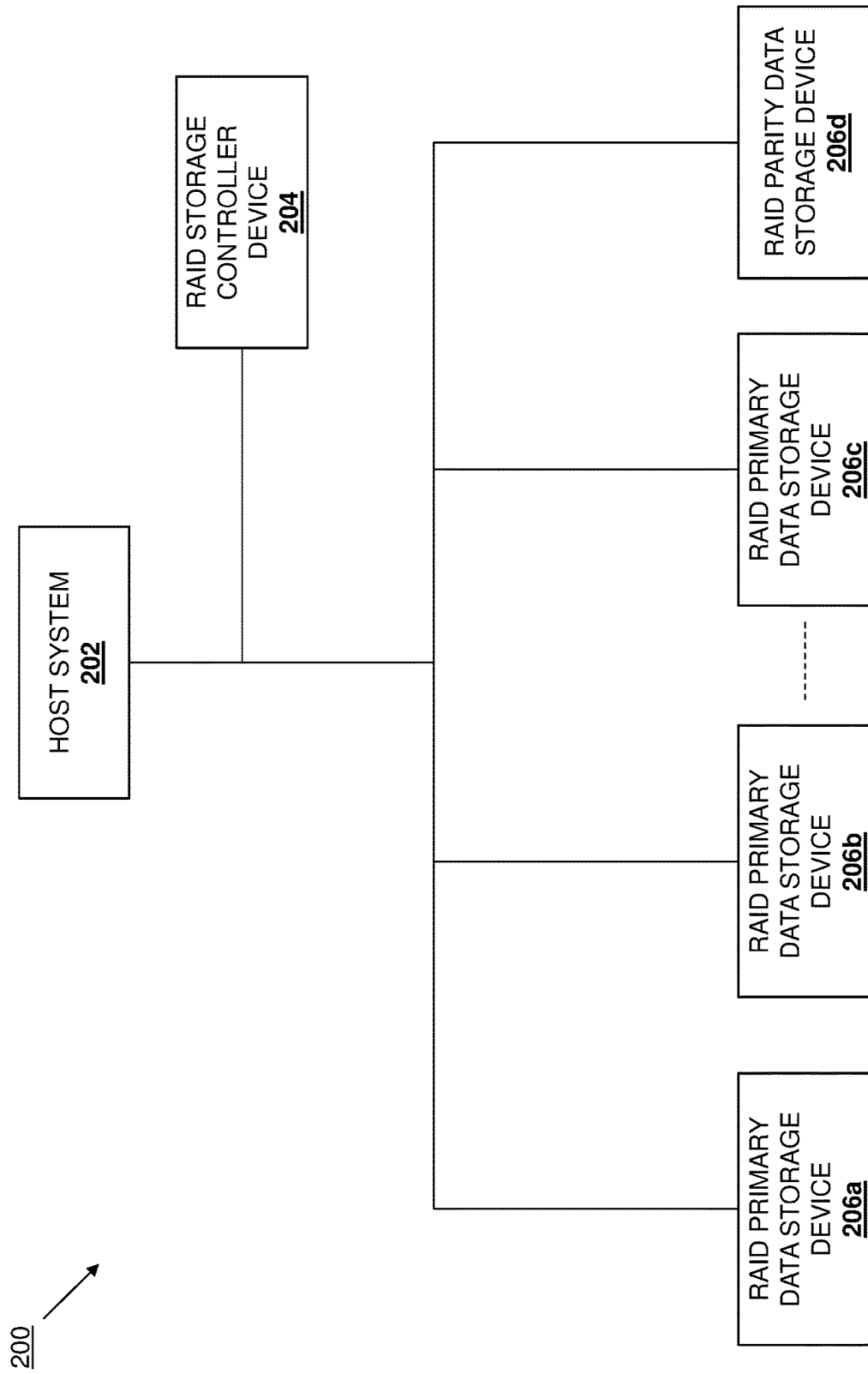
FIG. 2 is a schematic view illustrating an embodiment of a RAID data storage system.

Referring now to FIG. 2, an embodiment of a Redundant Array of Independent Disks (RAID) data storage system 200 is illustrated. In the illustrated embodiment, the RAID data storage system 200 includes a host system 202. In an embodiment, the host system 202 may be provided by the IHS 100 discussed above with reference to FIG. 1, and/or may include some or all of the components of the IHS 100. For example, the host system 202 may include server device(s), desktop computing device(s), a laptop/notebook computing device(s), tablet computing device(s), mobile phone(s), and/or any other host devices that one of skill in the art in possession of the present disclosure would recognize as operating similarly to the host system 202 discussed below. In the illustrated embodiment, the RAID data storage system 200 also includes a RAID storage controller device 204 that is coupled to the host system 202 and that may be provided by the IHS 100 discussed above with reference to FIG. 1, and/or may include some or all of the components of the IHS 100. For example, the RAID storage controller device 204 may include any storage device/disk array controller device that is configured to manage physical storage devices and present them to host systems as logical units.

Furthermore, the RAID data storage system 200 also includes a plurality of RAID data storage devices that are illustrated in FIG. 2 as a plurality of RAID primary data storage devices 206a, 206b, and up to 206c, along with a RAID parity storage data device 206d, each of which is coupled to the host system 202 and the RAID storage controller device 204. However, as will be appreciated by one of skill in the art in possession of the present disclosure, any or all the plurality of RAID data storage devices in the RAID data storage system 200 illustrated in FIG. 2 may perform duals roles for different data stripes, with any particular RAID data storage device operating as a RAID primary data storage device for one data stripe and a RAID parity data storage device for another data stripe. As will be appreciated by one of skill in the art in possession of the present disclosure, the RAID data storage devices in the RAID data storage system 200 of FIG. 2 are described as operating in a RAID 5 configuration, with the RAID primary data storage devices configured to store primary data (e.g., provided by the host system 202), and the RAID parity data storage device configured to store parity data that may be utilized to recover primary data when that primary data becomes unavailable on one of the RAID primary data storage devices.

However, while a few RAID data storage devices in a particular configuration are illustrated, one of skill in the art in possession of the present disclosure will recognize that many more RAID data storage devices may (and typically will) be coupled to the RAID storage controller device 204 (e.g., in a datacenter) and may be provided in other RAID configurations while remaining within the scope of the present disclosure. In the embodiments discussed below, the RAID data storage devices 206a-206d are described as being provided by Non-Volatile Memory express (NVMe) Solid State Drive (SSD) data storage device, but one of skill in the art in possession of the present disclosure will recognize that other types of data storage devices with similar functionality as the NVMe SSD data storage device (e.g., NVMe PCIe add-in cards, NVMe M.2 cards, etc.) may be implemented according to the teachings of the present disclosure and thus will fall within its scope as well. While a specific RAID data storage system 200 has been illustrated and described, one of skill in the art in possession of the present disclosure will recognize that the RAID data storage system of the present disclosure may include a variety of components and component configurations while remaining within the scope of the present disclosure as well.

Figure 3:
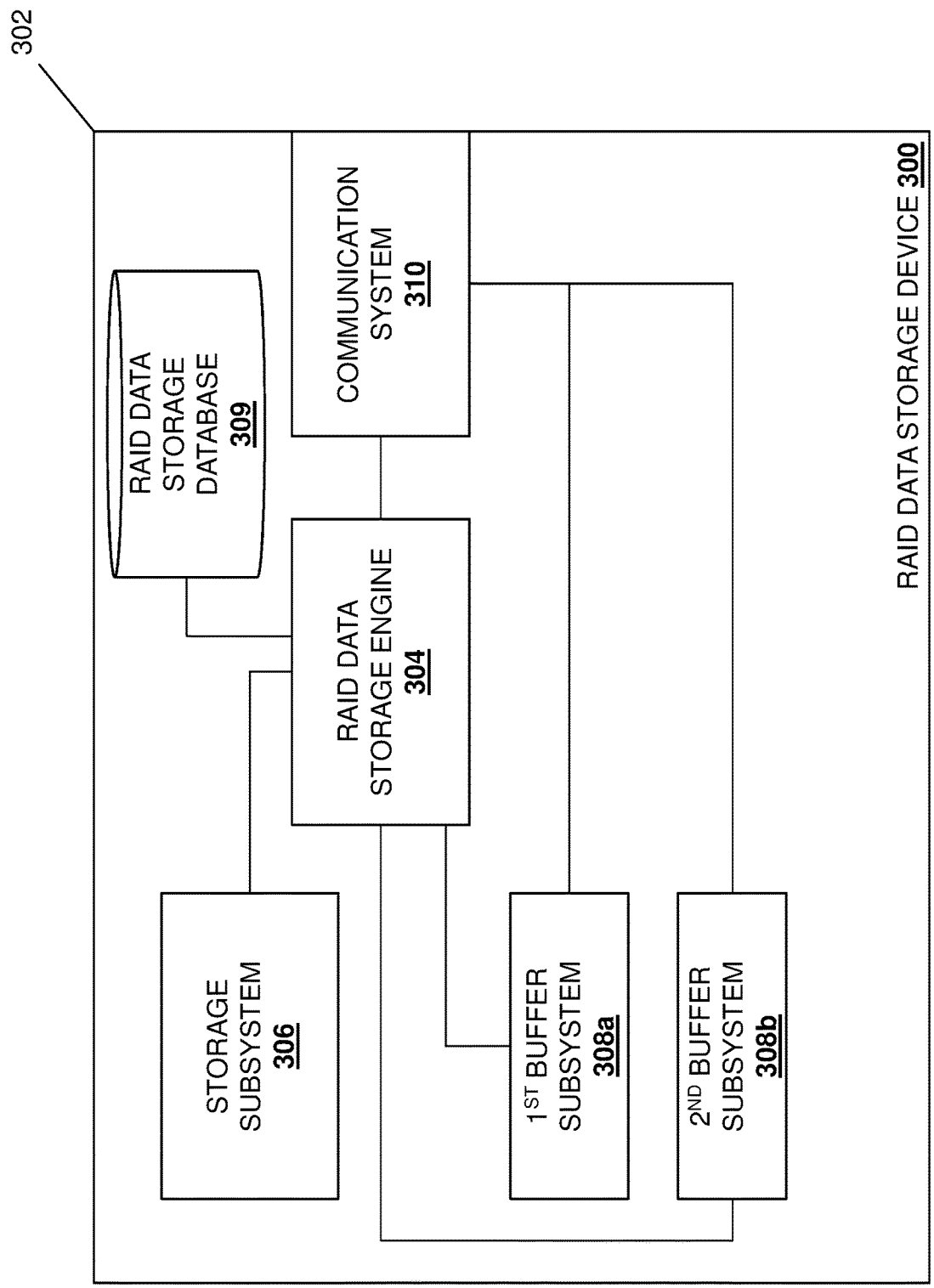
FIG. 3 is a schematic view illustrating an embodiment of a RAID data storage device that may be provided in the RAID data storage system of FIG. 2.

Referring now to FIG. 3, an embodiment of a RAID data storage device 300 is illustrated that may provide any or all of the RAID primary data storage devices and the RAID parity data storage device discussed above with reference to FIG. 2. As such, the RAID data storage device 300 may be provided by an NVMe SSD data storage device, but one of skill in the art in possession of the present disclosure will recognize that other types of storage devices with similar functionality as the NVMe SSD data storage devices (e.g., NVMe PCIe add-in cards, NVMe M.2 cards, etc.) may be provided according to the teachings of the present disclosure and thus will fall within its scope as well. In the illustrated embodiment, the RAID data storage device 300 includes a chassis 302 that houses the components of the RAID data storage device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a RAID data storage engine 304 that is configured to perform the functionality of the RAID data storage engines and/or RAID data storage devices discussed below. While not illustrated, one of skill in the art in possession of the present disclosure will recognize that the RAID data storage engine 304 may include, or be coupled to, other components such as a queues (e.g., submission queues and completion queues) and/or RAID data storage device components that would be apparent to one of skill in the art in possession of the present disclosure.

The chassis 302 may also house a storage subsystem 306 that is coupled to the RAID data storage engine 304 (e.g., via a coupling between the storage subsystem 306 and the processing system). Continuing with the example provided above in which the RAID data storage device 300 is an NVMe SSD data storage device, the storage subsystem 306 may be provided by a flash memory array such as, for example, a plurality of NAND flash memory devices. However, one of skill in the art in possession of the present disclosure will recognize that the storage subsystem 306 may be provided using other storage technologies while remaining within the scope of the present disclosure as well. The chassis 302 may also house a first buffer subsystem 308a that is coupled to the RAID data storage engine 304 (e.g., via a coupling between the first buffer subsystem 308a and the processing system). Continuing with the example provided above in which the RAID data storage device 300 is an NVMe SSD data storage device, the first buffer subsystem 308a may be provided by device buffer that is internal to the NVMe SSD data storage device, not accessible via a PCIe bus connected to the NVMe SSD data storage device, and conventionally utilized to initially store data received via write commands before writing them to flash media (e.g., NAND flash memory devices) in the NVMe SSD data storage device. However, one of skill in the art in possession of the present disclosure will recognize that the first buffer subsystem 308a may be provided using other buffer technologies while remaining within the scope of the present disclosure as well.

The chassis 302 may also house a second buffer subsystem 308b that is coupled to the RAID data storage engine 304 (e.g., via a coupling between the second buffer subsystem 308b and the processing system). Continuing with the example provided above in which the RAID data storage device 300 is an NVMe SSD data storage device, the second buffer subsystem 308b may be provided by a Controller Memory Buffer (CMB) subsystem. However, one of skill in the art in possession of the present disclosure will recognize that the second buffer subsystem 308b may be provided using other buffer technologies while remaining within the scope of the present disclosure as well. The chassis 302 may also house a storage system (not illustrated, but which may be provided by the storage device 108 discussed above with reference to FIG. 1) that is coupled to the RAID data storage engine 304 (e.g., via a coupling between the storage system and the processing system) and that includes a RAID data storage database 309 that is configured to store any of the information utilized by the RAID data storage engine 304 as discussed below.

The chassis 302 may also house a communication system 310 that is coupled to the RAID data storage engine 304 (e.g., via a coupling between the communication system 310 and the processing system), the first buffer subsystem 308*a*, and the second buffer subsystem 308*b*, and that may be provided by any of a variety of storage device communication technologies and/or any other communication components that would be apparent to one of skill in the art in possession of the present disclosure. Continuing with the example provided above in which the RAID data storage device 300 is an NVMe SSD data storage device, the communication system 310 may include any NVMe SSD data storage device communication components that enable the Direct Memory Access (DMA) operations described below, submission and completion queues, as well as any other components that provide NVMe SSD data storage device communication functionality that would be apparent to one of skill in the art in possession of the present disclosure. While a specific RAID data storage device 300 has been illustrated, one of skill in the art in possession of the present disclosure will recognize that RAID data storage devices (or other devices operating according to the teachings of the present disclosure in a manner similar to that described below for the RAID data storage device 300) may include a variety of components and/or component configurations for providing conventional RAID data storage device functionality, as well as the functionality discussed below, while remaining within the scope of the present disclosure as well.

Figure 4:
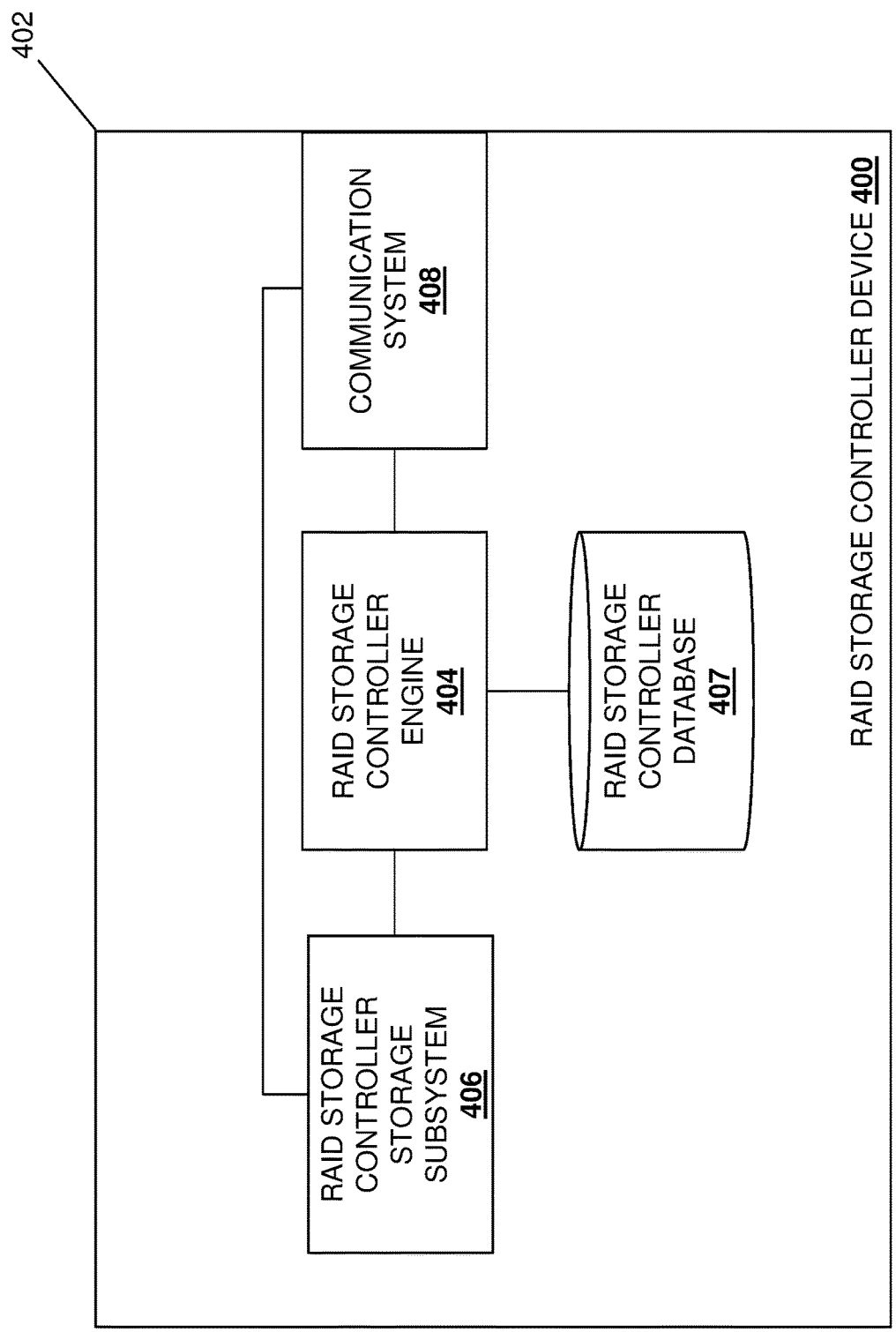
FIG. 4 is a schematic view illustrating an embodiment of a RAID storage controller device that may be provided in the RAID data storage system of FIG. 2.

Referring now to FIG. 4, an embodiment of a RAID storage controller device 400 is illustrated that may provide the RAID storage controller device 204 discussed above with reference to FIG. 2. As such, the RAID storage controller device 400 may be provided by the IHS 100 discussed above with reference to FIG. 1 and/or may include some or all of the components of the IHS 100, and in specific examples may include any storage device/disk array controller device that is configured to manage physical storage devices and present them to host systems as logical units. Furthermore, while illustrated and discussed as a RAID storage controller device 400, one of skill in the art in possession of the present disclosure will recognize that the functionality of the RAID storage controller device 400 discussed below may be provided by other devices that are configured to operate similarly as discussed below. In the illustrated embodiment, the RAID storage controller device 400 includes a chassis 402 that houses the components of the RAID storage controller device 400, only some of which are illustrated below. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a RAID storage controller engine 404 that is configured to perform the functionality of the RAID storage controller engines and/or RAID storage controller devices discussed below.

The chassis 402 may also house a RAID storage controller storage subsystem 406 (e.g., which may be provided by the storage 108 discussed above with reference to FIG. 1) that is coupled to the RAID storage controller engine 404 (e.g., via a coupling between the storage system and the processing system) and the communication system 408. The chassis 402 may also house a storage system 406 (e.g., not illustrated, but which may be provided by the storage 108 discussed above with reference to FIG. 1) that is coupled to the RAID storage controller engine 404 (e.g., via a coupling between the storage system and the processing system) and provides a RAID storage controller database 407 that is configured to store any of the information utilized by the RAID storage controller engine 404 discussed below. The chassis 402 may also house a communication system 408 that is coupled to the RAID storage controller engine 404 (e.g., via a coupling between the communication system 408 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure.

While a specific RAID storage controller device 400 has been illustrated, one of skill in the art in possession of the present disclosure will recognize that RAID storage controller devices (or other devices operating according to the teachings of the present disclosure in a manner similar to that described below for the RAID storage controller device 400) may include a variety of components and/or component configurations for providing conventional RAID storage controller device functionality, as well as the functionality discussed below, while remaining within the scope of the present disclosure as well. For example, while the RAID storage controller device 400 has been described as a hardware RAID storage controller device provided in a chassis, in other embodiments the RAID storage controller device may be a software RAID storage controller device provided by software (e.g., instructions stored on a memory system) in the host system 202 that is executed by a processing system in the host system 202 while remaining within the scope of the present disclosure as well. As such, in some embodiments, the operations of the RAID storage controller device 400 discussed below may be performed via the processing system in the host system 202.

Referring now to FIGS. 5A and 5B, embodiments of a RAID storage controller database 500 are illustrated that may provide the RAID storage controller database 407 discussed above with reference to FIG. 4. With reference first to FIG. 5A, an embodiment of the RAID storage controller database 500 is illustrated that includes a relative RAID data storage device command estimated execution time table 502 that may be utilized to provide for more accurate estimates of relative RAID data storage device loading. As illustrated, the relative RAID data storage device command estimated execution time table 502 may identify different "classes" of RAID data storage devices in different columns provided in the relative RAID data storage device command estimated execution time table 502, with the illustrated example including an enterprise class RAID data storage device 504 and a datacenter class RAID data storage device 506. As discussed in the examples below and as will be appreciated by one of skill in the art in possession of the present disclosure, enterprise class RAID data storage devices may include higher processing, memory, data transfer, and/or other capabilities relative to datacenter class RAID data storage devices. However, while two specific RAID data storage device classes are provided, one of skill in the art in possession of the present disclosure will appreciate that other classes of RAID data storage devices will fall within the scope of the present disclosure as well.

Furthermore, as illustrated, the relative RAID data storage device command estimated execution time table 502 may identify RAID data storage device "swim lanes" for each class of RAID data storage device, with columns for "write-intensive" RAID data storage devices 504a, "mixed-use" RAID data storage devices 504b, and "read-intensive" RAID data storage devices 504c identified for the enterprise class RAID data storage device 504, and "mixed-use" RAID data storage devices 506a and "read-intensive" RAID data storage devices 506b identified for the datacenter class RAID data storage device 506. In a specific example, a "write-intensive" RAID data storage device may be optimized for relatively high write workloads (e.g., it may be provided with extra flash memory blocks to replace others that wear due to the intensive write operations), while a "read-intensive" RAID data storage device may include different components (e.g., fewer flash memory blocks than the "write-intensive" RAID data storage device) that result in different performance characteristics.

As such, the "write-intensive" RAID data storage devices discussed above may include RAID data storage devices that experience write workloads that exceed a write threshold percentage (e.g., 50-60% write operations), the "read-intensive" RAID data storage devices may include RAID data storage devices that experience read workloads that exceed a read threshold percentage (e.g., 90% read operations), and the "mixed-use" RAID data storage devices may include RAID data storage devices that experience write workloads and read workloads within the write threshold percentage and read threshold percentage (e.g., 30% write operations and 70% read operations). However, while specific definitions for the RAID data storage device swim lanes have been provided, one of skill in the art in possession of the present disclosure will recognize that similar RAID data storage device swim lanes or other RAID data storage device categorizations may be defined in a variety of manners that will fall within the scope of the present disclosure as well.

In the illustrated embodiment, the relative RAID data storage device command estimated execution time table 502 may also identify RAID data storage device operations for each RAID data storage device swim lane identified for each class of RAID data storage device, with rows for sequential read operations 508, sequential write operations 510, random read operations 512, and random write operations 514. As will be appreciated by one of skill in the art in possession of the present disclosure, the specific example discussed below (and as illustrated in FIG. 5A) assumes block accesses that are 64 KB or larger are sequential operations, while smaller block accesses are random operations, which eliminates the need to track access patterns. However, one of skill in the art in possession of the present disclosure will appreciate that the tracking of block access patterns may be performed to increase the accuracy of the relative command execution time estimates discussed below while remaining within the scope of the present disclosure as well. Furthermore, one of skill in the art in possession of the present disclosure will appreciate that other RAID data storage device characteristics (e.g., vendor delineation) have been ignored in the relative RAID data storage device command estimated execution time table 502 to simplify the classification of the relative RAID data storage device command execution times in the examples below, and such characteristics may be considered to further increase the accuracy of the relative RAID data storage device command execution time estimations discussed below. As will also be appreciated by one of skill in the art in possession of the present disclosure, RAID data storage devices may include a variety of memory technologies (e.g., Storage Class Memory (SCM) technology, Triple Level Cell (TLC) technology, Quad Level Cell (QLC) technology, etc.) that may affect their command execution times as well, and the capabilities of such memory technologies may be considered to increase the accuracy of the relative RAID data storage device command execution time estimations discussed below.

Thus, in the example illustrated in FIG. 5A, relative RAID data storage device command execution times may be provided in the relative RAID data storage device command estimated execution time table 502 by, for example, performing the RAID data storage device operations for each RAID data storage device swim lane identified for each class of RAID data storage device during testing, and using the subsequent data to populate the relative RAID data storage device command estimated execution time table 502. However, in other examples, the relative RAID data storage device command execution times may be provided in the relative RAID data storage device command estimated execution time table 502 by monitoring actual RAID data storage device operations for each RAID data storage device swim lane identified for each class of RAID data storage device during operation of the RAID data storage system 200, and using the subsequent data to populate the relative RAID data storage device command estimated execution time table 502 (e.g., with average values over time.)

In the illustrated example, the relative RAID data storage device command estimated execution time table 502 indicates that, for sequential read operations 508, the enterprise class RAID data storage device 504 includes a value of "20" for sequential read operations that are performed on write intensive RAID data storage devices, a value of "20" for sequential read operations that are performed on mixed-use RAID data storage devices, and a value of "20" for sequential read operations that are performed on read intensive RAID data storage devices, while the datacenter class RAID data storage device 506 includes a value of "40" for sequential read operations that are performed on mixed-use RAID data storage devices, and a value of "50" for sequential read operations that are performed on read intensive RAID data storage devices. Similarly, the relative RAID data storage device command estimated execution time table 502 indicates that, for sequential write operations 510, the enterprise class RAID data storage device 504 includes a value of "25" for sequential write operations that are performed on write intensive RAID data storage devices, a value of "35" for sequential write operations that are performed on mixed-use RAID data storage devices, and a value of "70" for sequential write operations that are performed on read intensive RAID data storage devices, while the datacenter class RAID data storage device 506 includes a value of "70" for sequential write operations that are performed on mixed-use RAID data storage devices, and a value of "80" for sequential write operations that are performed on read intensive RAID data storage devices.

Similarly as well, the relative RAID data storage device command estimated execution time table 502 indicates that, for random read operations 512, the enterprise class RAID data storage device 504 includes a value of "2" for random read operations that are performed on write intensive RAID data storage devices, a value of "2" for random read operations that are performed on mixed-use RAID data storage devices, and a value of "2" for random read operations that are performed on read intensive RAID data storage devices, while the datacenter class RAID data storage device 506 includes a value of "5" for random read operations that are performed on mixed-use RAID data storage devices, and a value of "10" for random read operations that are performed on read intensive RAID data storage devices. Similarly, the relative RAID data storage device command estimated execution time table 502 indicates that, for random write operations 514, the enterprise class RAID data storage device 504 includes a value of "3" for random write operations that are performed on write intensive RAID data storage devices, a value of "7" for random write operations that are performed on mixed-use RAID data storage devices, and a value of "13" for random write operations that are performed on read intensive RAID data storage devices, while the datacenter class RAID data storage device 506 includes a value of "20" for random write operations that are performed on mixed-use RAID data storage devices, and a value of "35" for random write operations that are performed on read intensive RAID data storage devices. One of skill in the art in possession of the present disclosure will recognize that, while relative values are provided in the relative RAID data storage device command estimated execution time table 502 in the examples provided herein, actual RAID data storage device command execution times may be utilized while remaining within the scope of the present disclosure as well.

As can been seen in the example provided in FIG. 5A, relative RAID data storage device command execution times may vary significantly between commands of different block sizes, access types (e.g., reads vs. writes), and access patterns (e.g., sequential vs. random), which demonstrates how conventional RAID data storage device loading determinations that are based simply on RAID data storage device command queue depths may be relatively inaccurate. Furthermore, while a specific relative RAID data storage device command estimated execution time table 502 is illustrated and described, a variety of RAID data storage device variables and their values may be tracked and utilized with the teachings of the present disclosure in order to provide for the estimations of command execution times for RAID data storage devices (which may differ across RAID data storage devices from different manufacturers and/or in different classes) for use in determining relative RAID data storage device loading while remaining within the scope of the present disclosure.

With reference now to FIG. 5B, the RAID storage controller database 500 may include a relative RAID data storage device load tracking table 516 that, as discussed below, may be utilized to track RAID data storage device loads for the RAID data storage devices 206a-206d in the RAID data storage system 200 (as well as RAID data storage devices in other RAID data storage systems.) In the illustrated embodiment, the relative RAID data storage device load tracking table 516 includes a command column 518 that may be utilized to identify commands in command queues of RAID data storage device, a description column 520 that may be utilized to describe commands in the command column 518, and columns that identify each of the RAID data storage devices being tracked (e.g., the RAID data storage devices 206a, 206, 206c, and 206d in the illustrated embodiment), which may be utilized to provides estimated command execution times by each RAID data storage device for each of the commands in the command column 518. Furthermore, the relative RAID data storage device load tracking table 516 includes a total row 522 that, as discussed in further detail below, tracks the total or sum of the estimated command execution times for the commands in a command queue of any particular RAID data storage device. However, while a specific relative RAID data storage device load tracking table 516 is illustrated and described, one of skill in the art in possession of the present disclosure will appreciate that the RAID data storage device load tracking may be performed in a variety of manners that will fall within the scope of the present disclosure as well.

Figure 6:
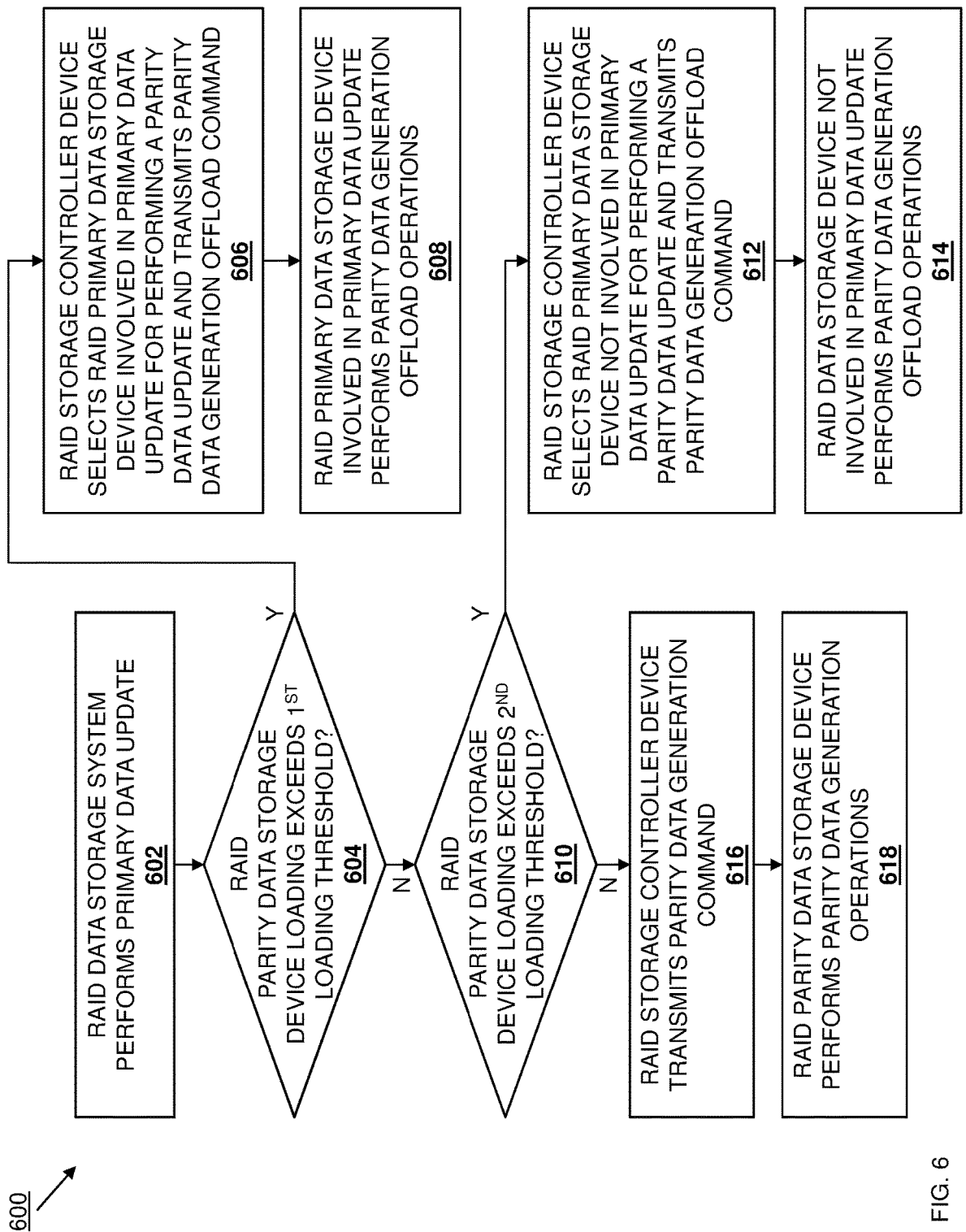
FIG. 6 is a flow chart illustrating an embodiment of a method for offloading parity data generation from a RAID parity data storage device.
Figure 7:
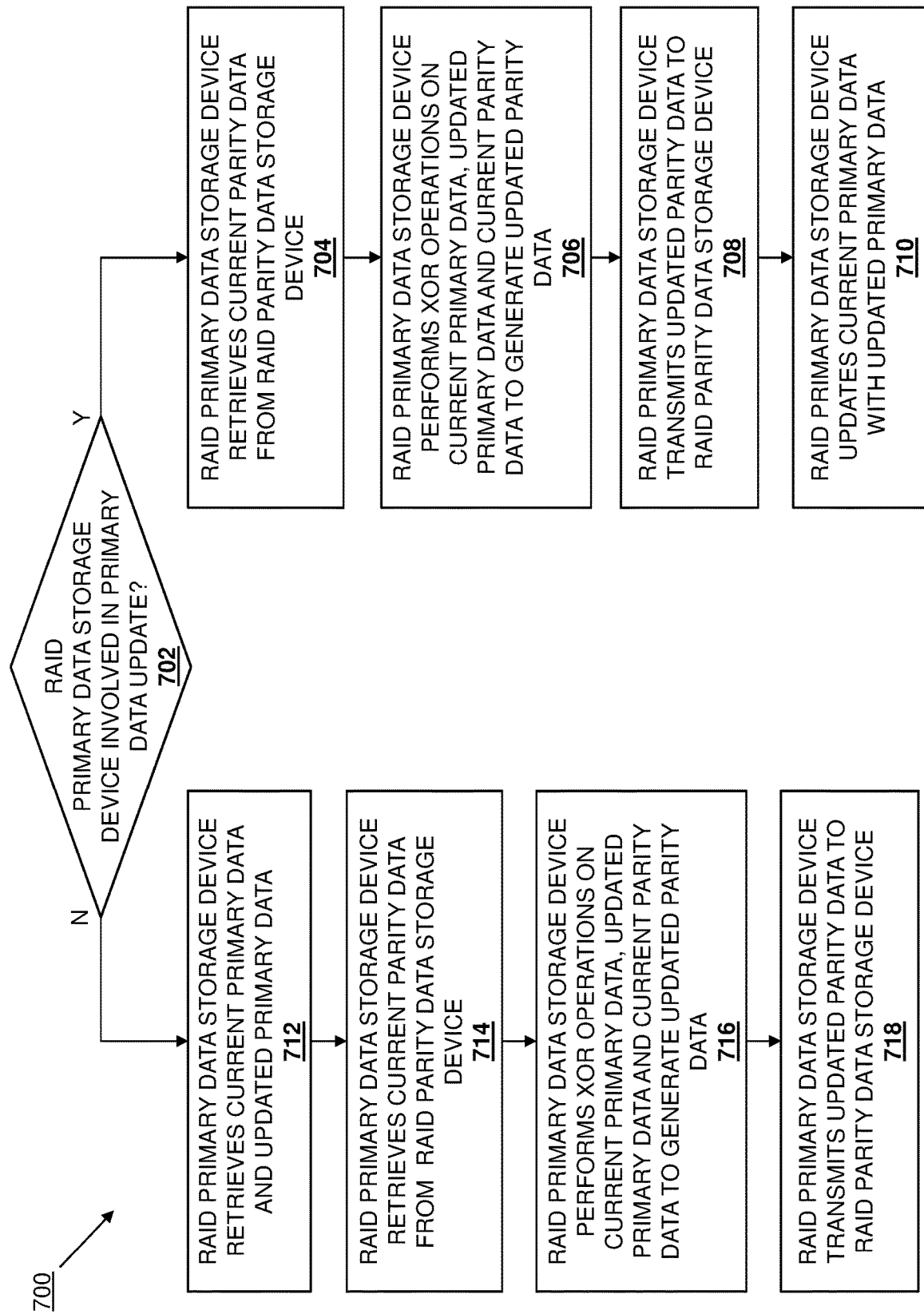
FIG. 7 is a flow chart illustrating an embodiment of a method for offloading parity data generation from a RAID parity data storage device.

Referring now to FIGS. 6 and 7, embodiments of methods 600 and 700 for offloading parity data generation from a RAID parity data storage device are illustrated. As discussed below, the systems and methods of the present disclosure provide a RAID storage controller device that monitors the relative RAID data storage device loading of accessible RAID data storage devices and, in response to a primary data update in a first RAID data storage system, determine whether a RAID parity data storage device in the first RAID data storage system exceeds a first loading threshold relative to RAID primary data storage devices in the first RAID data storage system that are involved in the primary data update. In the event the RAID parity data storage device exceeds the first loading threshold, the RAID storage controller device identifies a RAID primary data storage device in the first RAID data storage system that was involved in the primary data update for performing a parity data update for the RAID parity data storage device, and transmits a parity data generation offload command to that RAID primary data storage device. In response to receiving the parity data generation offload command, that RAID primary data storage device retrieves current parity data from the RAID parity data storage device, and interim parity data from second RAID primary data storage device(s) that were involved in the primary data update (if any exist), and performs XOR operations on current primary data that was previously stored on that RAID primary data storage device, updated primary data that was retrieved and stored on that RAID primary data storage device during the primary data update, the current parity data that was retrieved from the RAID parity data storage device, and interim parity data from second RAID primary data storage device(s) that were involved in the primary data update (if any exist), in order to generate updated parity data. That RAID primary data storage device then transmits the updated parity data to the RAID parity data storage device, and updates its current primary data with the updated primary data.

If the RAID parity data storage device does not exceed the first loading threshold, the RAID storage controller device determines whether the RAID parity data storage device in the first RAID data storage system exceeds a second loading threshold relative to RAID primary data storage devices in the first RAID data storage system that are not involved in the primary data update, and RAID primary data storage devices in a second RAID data storage system that are not involved in the primary data update. In the event the RAID parity data storage device exceeds the second loading threshold, the RAID storage controller device identifies a first RAID primary data storage device in one of the first RAID data storage system or second RAID data storage system for performing a parity data update for the RAID parity data storage device, and transmits a parity data generation offload command to that first RAID primary data storage device. In response to receiving the parity data generation offload command, that first RAID primary data storage device retrieves current primary data and updated primary data from a second RAID primary data storage device involved in the primary data update, current parity data from the RAID parity data storage device, and interim parity data from third RAID primary data storage device(s) that were involved in the primary data update (if any exist), and performs XOR operations on current primary data, updated primary data, the current parity data, and the interim parity data (if any), in order to generate updated parity data. That RAID primary data storage device then transmits the updated parity data to the RAID parity data storage device. As such, relatively over-loaded RAID data storage devices may have some of their processing operations offloaded to relatively under-loaded RAID data storage devices, thus providing load balancing amongst the RAID data storage devices in RAID data storage system(s).

Figure 8:
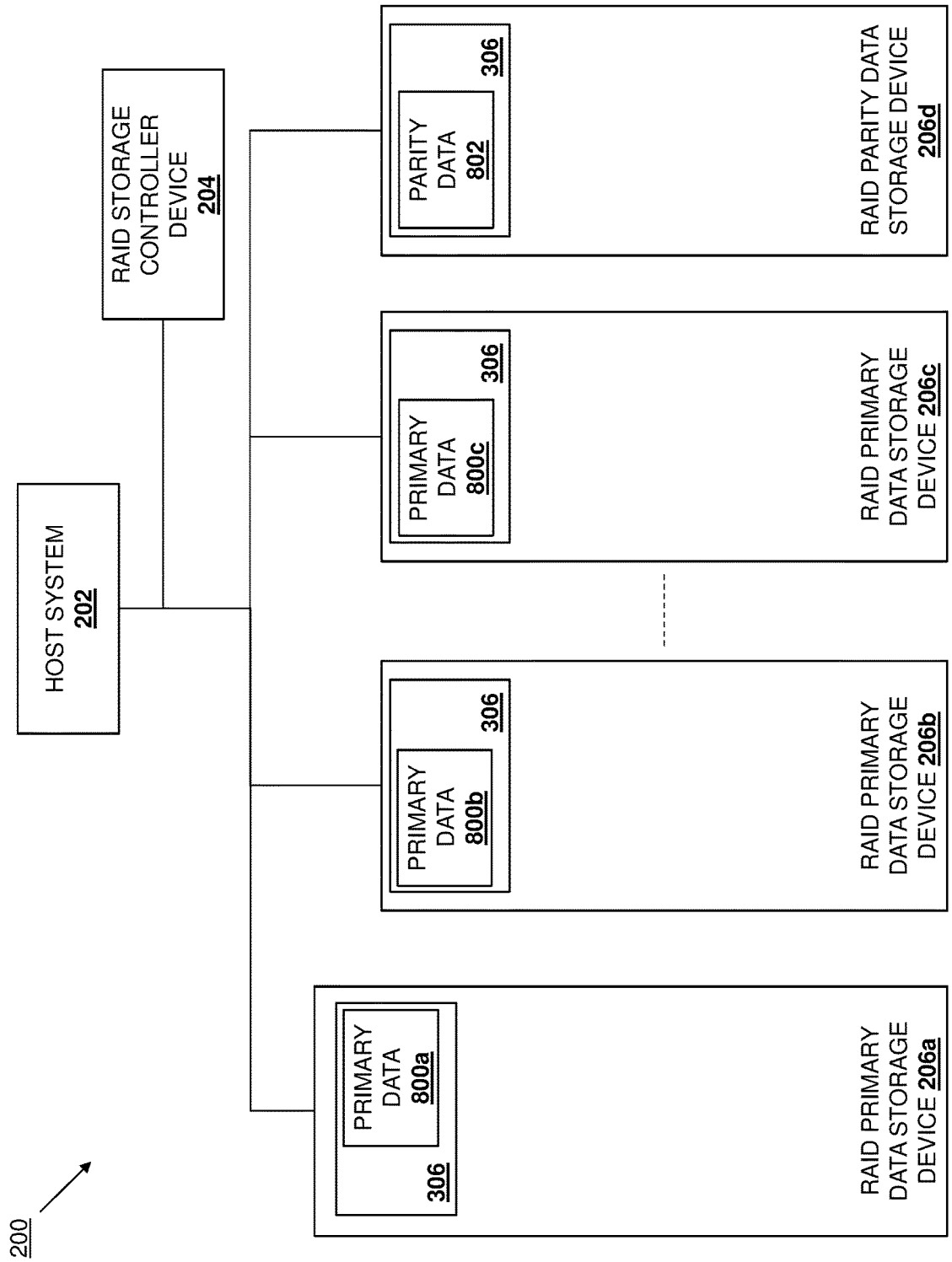
FIG. 8 is a schematic view illustrating an embodiment of the RAID data storage system of FIG. 2 operating during the method of FIG. 6.

With reference to FIG. 8, the RAID data storage system 200 is illustrated with the RAID primary data storage device 206a storing primary data 800a in its storage subsystem 306, the RAID primary data storage device 206b storing primary data 800b in its storage subsystem 306, and the RAID primary data storage device 206c storing primary data 800c in its storage subsystem 306. While only three RAID primary data storage devices are illustrated and described in the examples provided below, one of skill in the art in possession of the present disclosure will recognize that any number of RAID primary data storage devices may store primary data while remaining within the scope of the present disclosure as well. In addition, the RAID data storage system 200 is also illustrated with the RAID parity data storage device 206d storing parity data 802 in its storage subsystem 306, and one of skill in the art in possession of the present disclosure will recognize that the parity data 802 may have been generated via an XOR operation performed on the primary data 800a-800c in the RAID primary data storage devices 206a-206c, and allows for the rebuilding of any primary data stored on any one RAID primary data storage device in the event that primary data/RAID primary data storage device becomes unavailable.

As will also be appreciated by one of skill in the art in possession of the present disclosure, and as discussed in some of the examples provided below, the primary/parity data storage configuration illustrated in FIG. 8 provides primary/parity for a single data strip, and different data strips may have different primary/parity data storage configurations (e.g., in a plurality of RAID data storage devices provided in a RAID data storage system, a first data stripe may include primary data on first, second, and third RAID data storage devices and parity data on a fourth RAID data storage device; a second data stripe may include primary data on the second, third, and fourth RAID data storage devices and parity data on the first RAID data storage device, etc.) As such, while a particular RAID data storage system device and data configuration is illustrated for purposes of the examples below, one of skill in the art in possession of the present disclosure will recognize that a variety of device and data configurations will fall within the scope of the present disclosure as well.

The method 600 begins at block 602 where a RAID data storage system performs a primary data update. In an embodiment, at block 602, one or more RAID primary data storage devices in the RAID data storage system 200 may have their primary data updated. In the examples below, a single RAID primary data storage device is described as updating its primary data for simplicity. However, one of skill in the art in possession of the present disclosure will appreciate that primary data updates may involve the updating of data on multiple RAID primary data storage devices (e.g., "full-stripe" write operations, "partial-stripe" write operations, etc.), and as discussed below those primary data updates will fall within the scope of the present disclosure as well.

Figure 9A:
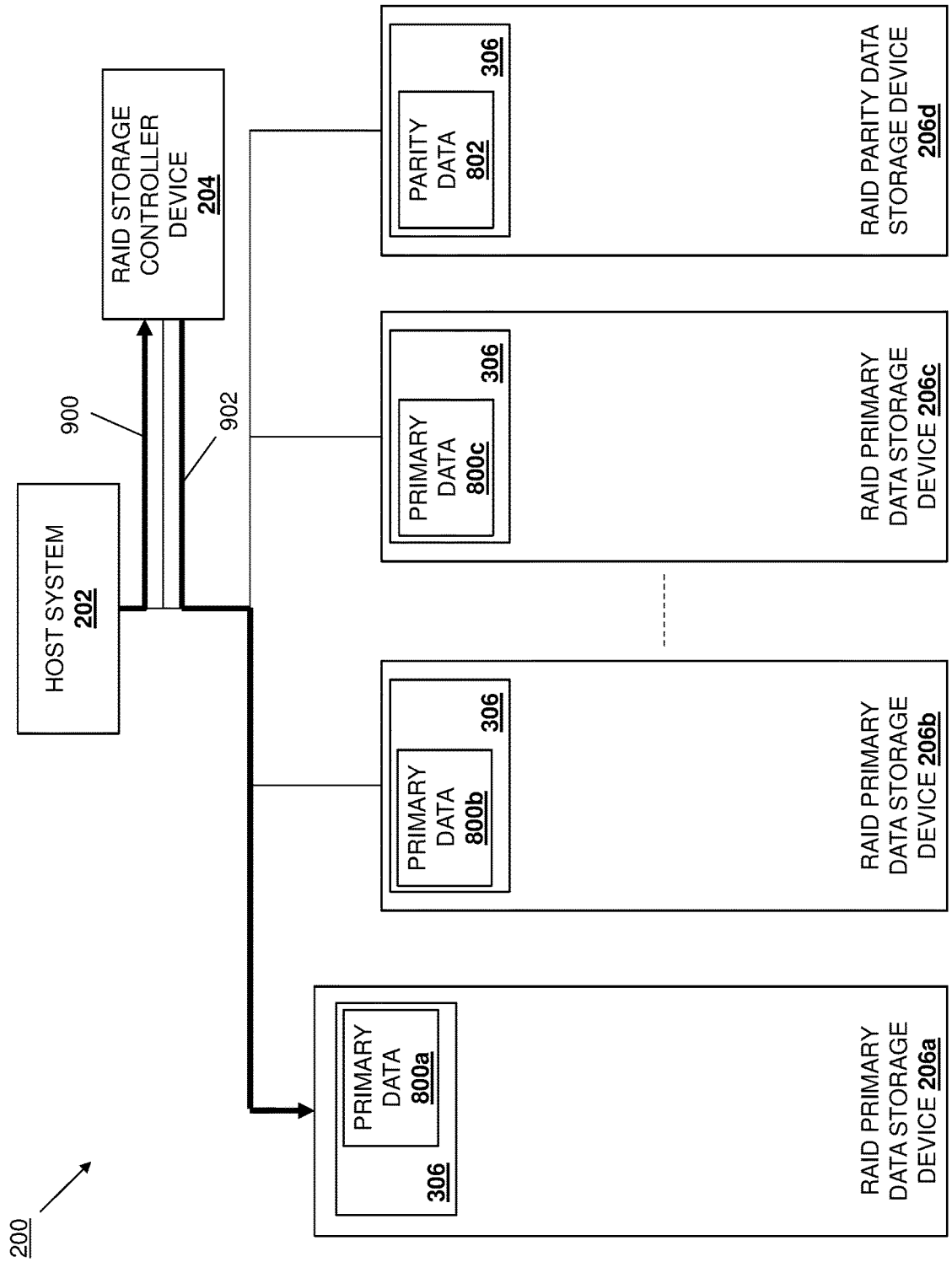
FIG. 9A is a schematic view illustrating an embodiment of the RAID data storage system of FIG. 2 operating during the method of FIG. 6.

With reference to FIG. 9A, the host system 202 may generate a write command 900 that instructs the writing of primary data that is located on the host system 200 to the RAID primary data storage devices 206a-206c, and may transmit that write command 900 to the RAID storage controller device 204. As will be appreciated by one of skill in the art in possession of the present disclosure, the generation and/or transmission of the write command 900 by the host system 202 to the RAID storage controller device 204 at block 602 may include a variety of control plane communications between the host system 202 and the RAID storage controller device 204 that have been omitted for clarity of discussion. As such, at block 602, the RAID storage controller device 204 may receive the write command 900 and, in response to that write command 900, may generate commands and transmit the commands to one or more of the RAID data storage devices 206a-d. The discussion below describes a situation in which the RAID storage controller device 204 determines that the write command 900 requires that updated primary data be written to the RAID primary data storage device 206a, but one of skill in the art in possession of the present disclosure will appreciate that a write command may require updated primary data to be written to any RAID data storage device(s) while remaining within the scope of the present disclosure as well.

As such, in an embodiment of block 602, the RAID storage controller device 204 may generate a command that instructs the writing of the updated primary data on the host system 202 to the RAID primary data storage device 206a, and transmit that command to the RAID primary data storage device 206a. For example, FIG. 9A illustrates the RAID storage controller device 204 transmitting a command 902 to the RAID primary data storage device 206a, and one of skill in the art in possession of the present disclosure will appreciate that the command 902 may identify the updated primary data on the host system 202, as well as any other information that would be apparent to one of skill in the art in possession of the present disclosure.

In some embodiments, the command 902 may be a multi-operation command like those described in U.S. patent application Ser. No. 16/585,296, attorney docket no. 16356.2084US01, filed on Sep. 27, 2019. For example, the command 902 may be a WRITE multi-operation command that is configured to cause the RAID primary data storage device 206a to perform the multiple operations described below. However, while described as providing a multi-operation command at block 602, one of skill in the art in possession of the present disclosure will recognize that the multiple operations performed by the RAID primary data storage device 206a discussed below may be performed in response to respective commands transmitted by the RAID storage controller device 204 while remaining within the scope of the present disclosure as well. In a specific example, the transmission of the command 902 may include the RAID storage controller device 204 providing the command 902 in a submission queue that is included in the communication system 310 in the RAID primary data storage device 206a/300, and then ringing a doorbell for the RAID primary data storage device 206a/300. However, one of skill in the art in possession of the present disclosure will recognize that the command 902 may be provided to the RAID primary data storage device 206a in a variety of manners that will fall within the scope of the present disclosure as well.

As such, in some examples the RAID storage engine 304 in the RAID primary data storage device 206a/300 may respond to the ringing of its doorbell by accessing the command 902 in the submission queue in its communication system 310. In embodiments in which the command 902 is a multi-operation command, the RAID storage engine 304 in the RAID primary data storage device 206a/300 may identify the multiple operations instructed by that command 902 (as described in U.S. patent application Ser. No. 16/585,296, filed on Sep. 27, 2019.)

Figure 9B:
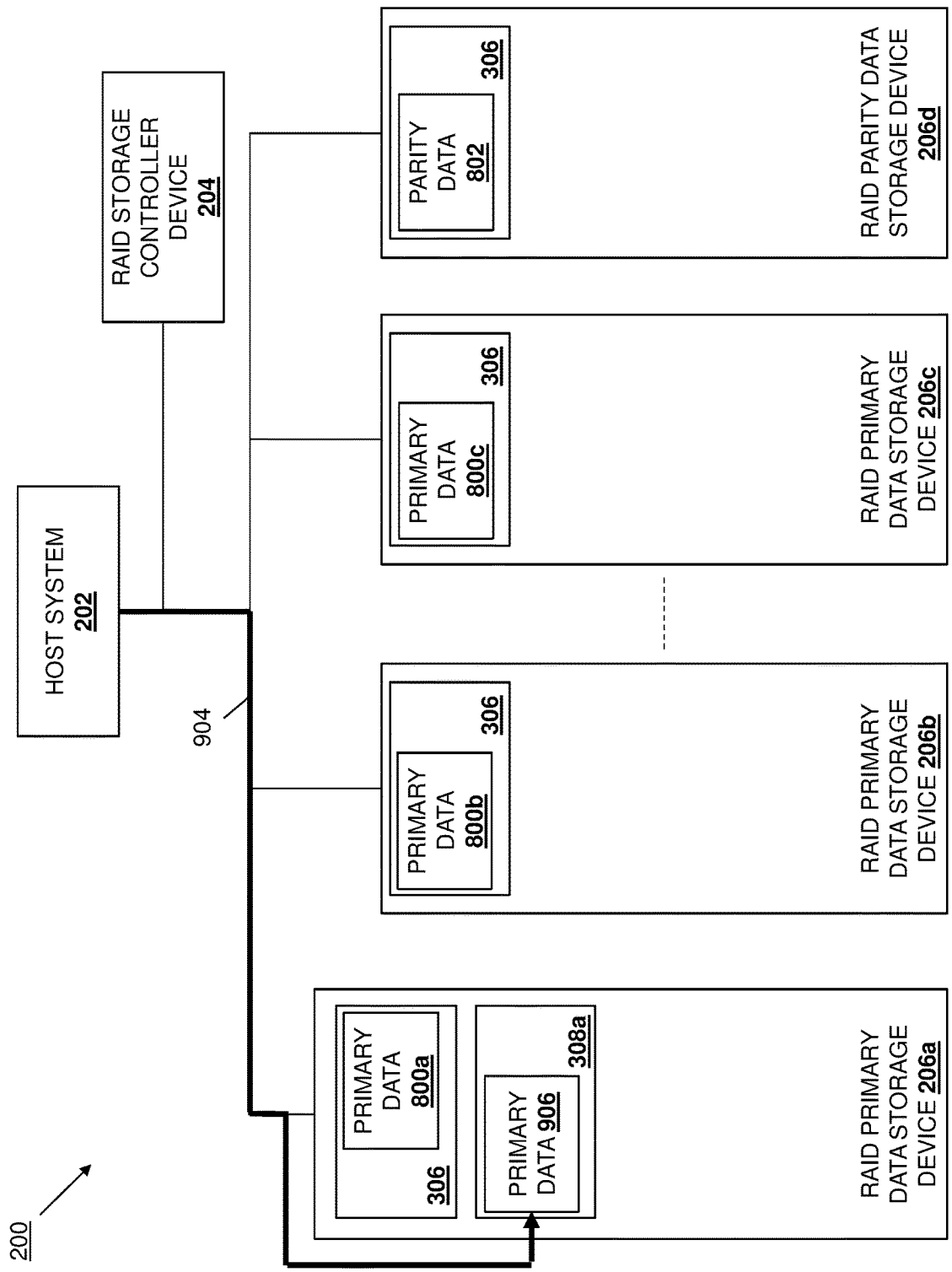
FIG. 9B is a schematic view illustrating an embodiment of the RAID data storage system of FIG. 2 operating during the method of FIG. 6.

With reference to FIG. 9B, in an embodiment of block 602 and based on the command 902 (which is a multi-operation command as described above in this embodiment), the RAID storage engine 304 in the RAID primary data storage device 206a/300 may operate to perform a Direct Memory Access (DMA) operation 904 that accesses primary data 906 that is stored on the host system 202 (e.g., in a memory system or storage system included on the host system 202) and writes that primary data 906 to its first buffer subsystem 308a (e.g., in a device buffer subsystem in the RAID primary data storage device 206a as described in the example above). As will be appreciated by one of skill in the art in possession of the present disclosure, the primary data 906 may be considered as "updated primary data" that provides an update to the primary data 800a that provides "current primary data" stored in the storage subsystem 306 in the RAID primary data storage device 206a, although other primary data writing scenarios will fall within the scope of the present disclosure as well.

In the examples below, the RAID parity data generation offload functionality of the present disclosure is enabled in response to write operations. As will be appreciated by one of skill in the art in possession of the present disclosure, the use of the RAID parity data generation offload functionality is provided for write operations rather than read operations because parity data for a stripe only needs to be recalculated for write operations (as read operations do not modify data and thus do not require parity data recalculation.)

The method 600 then proceeds to decision block 604 where it is determined whether a RAID parity data storage device loading exceeds a first loading threshold. As discussed in the example below, the first loading threshold corresponds to a relative loading of the RAID parity data storage device and the RAID primary data storage devices involved in a data update, and is distinguished from a second loading threshold that corresponds to a relative loading of the RAID parity data storage device and the RAID primary data storage devices that are not involved in the data update. In an embodiment, at or prior to decision block 604, the RAID storage controller engine 404 in the RAID storage controller device 204/400 may operate to track the loading of RAID data storage devices in the RAID data storage system 200. Furthermore, in some embodiments, at or prior to decision block 604, the RAID storage controller engine 404 in the RAID storage controller device 204/400 may operate to track the loading of RAID data storage devices in RAID data storage system(s) that are separate from the RAID data storage system 200 (e.g., different RAIDsets), but which may be substantially similar to the RAID data storage system 200 and may include RAID data storage devices that are accessible to the RAID storage controller device 204. In the examples below, each of the RAID data storage devices 206a-206d are enterprise class, mixed use RAID data storage devices, but one of skill in the art in possession of the present disclosure will appreciate that the datacenter class RAID data storage devices discussed above, combinations of enterprise and datacenter class RAID data storage devices, and/or other classes of RAID data storage devices that may be write-intensive, read-intensive, or mixed-use will fall within the scope of the present disclosure as well.

For example, FIG. 10 illustrates the RAID data storage device database 407/500 subsequent to the tracking of the loading of the RAID data storage devices 206a, 206b, 206c, and 206d. One of skill in the art in possession of the present disclosure will recognize how, in the illustrated example of the relative RAID data storage device load tracking table 516, a "COMMAND 0" includes a 4 KB read operation (corresponding to a random read operation) to the RAID data storage device 206b, which corresponds to a relative RAID data storage device command execution time of "2" for random read operations 512 performed on a mixed-use RAID data storage device 504b in the enterprise class RAID data storage device 504 in the relative RAID data storage device command estimated execution time table 502, and provides a relative RAID data storage device command execution time of "2" for the RAID data storage device 206b in the relative RAID data storage device load tracking table 516.

Similarly, in the illustrated example of the relative RAID data storage device load tracking table 516, a "COMMAND 1" includes 256 KB read operations (corresponding to four 64 KB sequential read operations) to the RAID data storage devices 206a, 206b, 206c, and 206d, which corresponds to relative RAID data storage device command execution times of "20" for sequential read operations 508 performed on a mixed-use RAID data storage device 504b in the enterprise class RAID data storage device 504 in the relative RAID data storage device command estimated execution time table 502, and provides relative RAID data storage device command execution times of "20" for each of the RAID data storage devices 206a, 206b, 206c, and 206d in the relative RAID data storage device load tracking table 516.

Similarly, in the illustrated example of the relative RAID data storage device load tracking table 516, a "COMMAND 2" includes 16 KB write operations (corresponding to four 4 KB random write operations) to the RAID data storage device 206c, which corresponds to a relative RAID data storage device command execution time of "7" for random write operations 514 performed on a mixed-use RAID data storage device 504b in the enterprise class RAID data storage device 504 in the relative RAID data storage device command estimated execution time table 502, and provides a relative RAID data storage device command execution time of "28" (e.g., four random write operations, each with a relative RAID data storage device command execution time of "7") for the RAID data storage device 206c in the relative RAID data storage device load tracking table 516.

Similarly, in the illustrated example of the relative RAID data storage device load tracking table 516, a "COMMAND 3" includes 128 KB write operations (corresponding to two 64 KB sequential write operations) to the RAID data storage devices 206c and 206d, which corresponds to a relative RAID data storage device command execution time of "35" for sequential write operations 510 performed on a mixed-use RAID data storage device 504b in the enterprise class RAID data storage device 504 in the relative RAID data storage device command estimated execution time table 502, and provides a relative RAID data storage device command execution time of "35" for each of the RAID data storage devices 206c and 206d in the relative RAID data storage device load tracking table 516.

Similarly, in the illustrated example of the relative RAID data storage device load tracking table 516, a "COMMAND 4" includes a 2 KB read operation (corresponding to random read operations) to the RAID data storage device 206d, which corresponds to a relative RAID data storage device command execution time of "2" for random read operations 512 performed on a mixed-use RAID data storage device 504b in the enterprise class RAID data storage device 504 in the relative RAID data storage device command estimated execution time table 502, and provides a relative RAID data storage device command execution time of "1" (e.g., ½ of a random read operation with a relative RAID data storage device command execution time of "2") for the RAID data storage device 206d in the relative RAID data storage device load tracking table 516.

Thus, the total row 522 that tracks the total or sum of the estimated command execution times for the RAID data storage devices 206a-206d in the example of the relative RAID data storage device load tracking table 516 illustrated in FIG. 10 includes total estimated command execution times of "20" for the RAID data storage device 206a, "22" for the RAID data storage device 206b, "83" for the RAID data storage device 206c, and "56" for the RAID data storage device 206d. While not explicitly illustrated, similar relative RAID data storage device load tracking tables may be maintained for other RAID data storage systems (i.e., that are coupled to the RAID data storage system 200) in order to track the loading of the RAID data storage devices in those RAID data storage systems, and may be accessible to the RAID storage controller device 204. For example, each RAID storage controller device in any number of RAID data storage systems may maintain a respective relative RAID data storage device load tracking table for the RAID data storage devices in its RAID data storage system, and may share that relative RAID data storage device load tracking table with other RAID storage controller devices to which it is connected.

In one specific embodiment, the RAID storage controller engine 404 in the RAID storage controller device 204/400 may group RAID data storage devices based on the status of those RAID data storage devices. For example, a first group may include the RAID parity data storage device that is involved in the primary data update (e.g., the RAID parity data storage device 206d in the example above), a second group may include any RAID primary data storage devices that are involved in the primary data update (e.g., the RAID primary data storage device 206a in the example above), a third group may include any RAID primary data storage devices that are included in the RAID data storage system in which the primary data update is occurring but that are not involved in the primary data update (e.g., the RAID primary data storage devices 206b and 206c in the example above), and a fourth group may include any RAID primary data storage devices that are not included in the RAID data storage system in which the primary data update is occurring (and thus are not involved in the primary data update.) However, while a specific example of particular groupings are described, one of skill in the art in possession of the present disclosure will appreciate that the selection of a "proxy" RAID data storage device to which the generation of parity data may be offloaded may be made in a variety of manners that will fall within the scope of the present disclosure as well.

Thus, in an embodiment of decision block 604, the RAID storage controller engine 404 in the RAID storage controller device 204/400 may utilize the relative RAID data storage device load tracking table 516 in order to determine whether the RAID parity data storage device loading exceeds the first loading threshold. In a specific embodiment, the first loading threshold may be relative to the second group of RAID data storage devices discussed above that include any RAID primary data storage devices that are involved in the primary data update, and may include a determination by the RAID storage controller engine 404 in the RAID storage controller device 204/400 of whether the RAID parity data storage device 206d is loaded some threshold percentage greater than the RAID primary data storage devices that are involved in the primary data update. Thus, continuing with the specific example provided above, at decision block 604, the RAID storage controller engine 404 in the RAID storage controller device 204/400 may determine whether the total estimated command execution time for the RAID parity data storage device 206d (e.g., "56" in the illustrated example) is some threshold percentage greater than the total estimated command execution time for the RAID primary data storage device 206a (e.g., "20" in the illustrated example). As will be appreciated by one of skill in the art in possession of the present disclosure, the first loading threshold may be selected based on any criteria, and may include absolute times and/or any other measurements (rather than the threshold percentage discussed above) while remaining within the scope of the present disclosure as well.

Figure 11A:
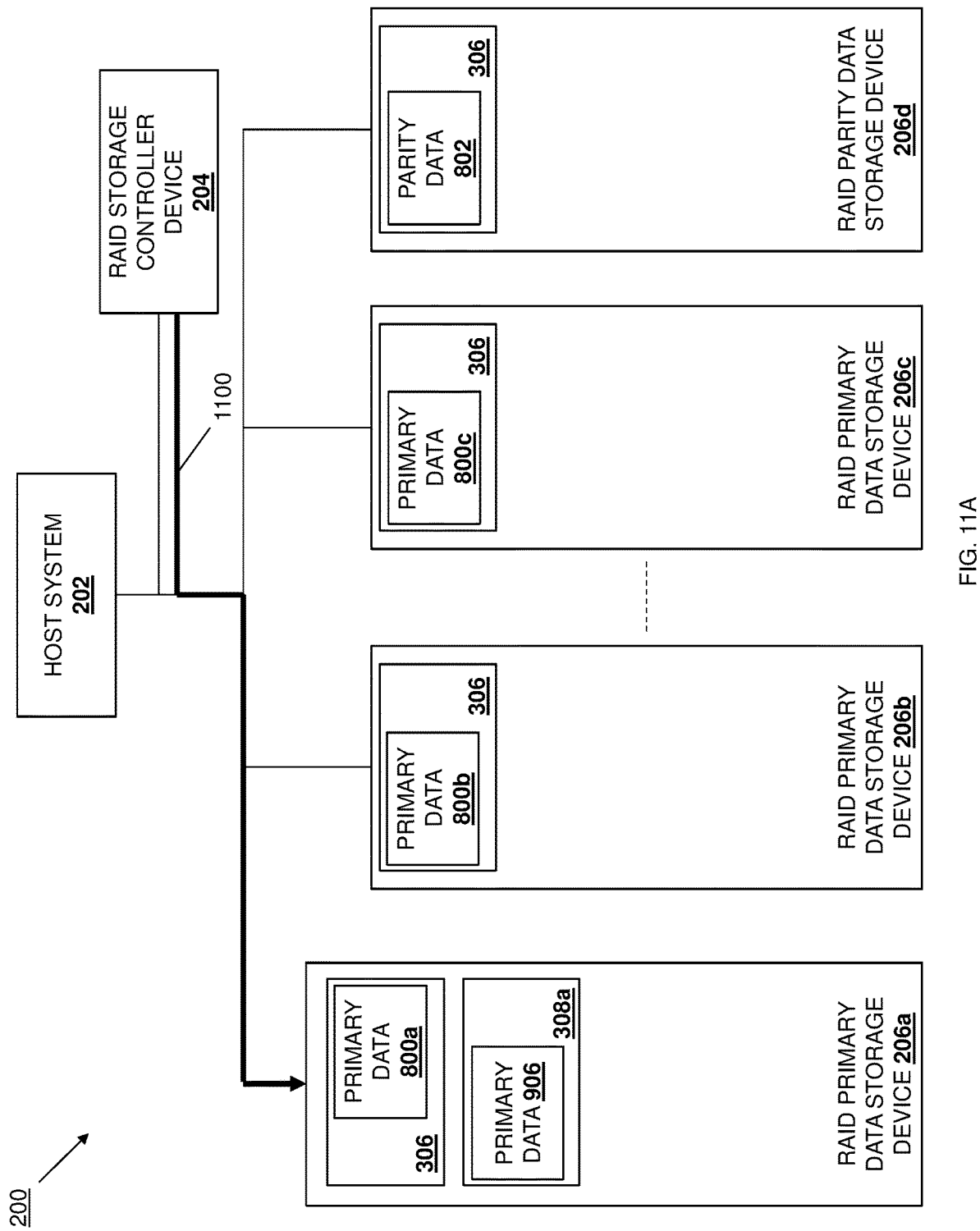
FIG. 11A is a schematic view illustrating an embodiment of the RAID data storage system of FIG. 2 operating during the method of FIG. 6.

If, at decision block 604, it is determined that the RAID parity data storage device loading exceeds the first loading threshold, the method 600 proceeds to block 606 where a RAID storage controller device selects a RAID primary data storage device that is involved in the primary data update for performing a parity data update and transmits a parity data generation offload command. In an embodiment, at block 606, the RAID storage controller engine 404 in the RAID storage controller device 204/400 may determine that the total estimated command execution time for the RAID parity data storage device 206d (e.g., "56" in the illustrated example) is some threshold percentage greater than the total estimated command execution time for the RAID primary data storage device 206a (e.g., "20" in the illustrated example) and, in response, may select the RAID primary data storage device 206a for performing a parity data update, and generate a parity data generation offload command. While the illustrated example includes only one RAID primary data storage device that is involved in the primary data update, in the event the primary data update involves multiple RAID primary data storage devices and the RAID parity data storage device loading exceeds the first loading threshold, the RAID storage controller device may select the RAID primary data storage device with the lowest total estimated command execution time. With reference to FIG. 11A, the RAID storage controller engine 404 in the RAID storage controller device 204/400 may then transmit the parity data generation offload command 1100 via its communication system 408 to the RAID primary data storage device 206a.

In some embodiments, the parity data generation offload command 1100 may be a multi-operation command like those described in U.S. patent application Ser. No. 16/585,296, filed on Sep. 27, 2019. For example, the command 902 may be a PARITY GENERATION OFFLOAD multi-operation command that is configured to cause the RAID primary data storage device 206a to perform the multiple operations described below. However, while described as providing a multi-operation command at block 606, one of skill in the art in possession of the present disclosure will recognize that the multiple operations performed by the RAID primary data storage device 206a discussed below may be performed in response to respective commands transmitted by the RAID storage controller device 204 while remaining within the scope of the present disclosure as well. In a specific example, the transmission of the command 1100 may include the RAID storage controller device 204 providing the command 1100 in a submission queue that is included in the communication system 310 in the RAID primary data storage device 206a/300, and then ringing a doorbell for the RAID primary data storage device 206a/300. However, one of skill in the art in possession of the present disclosure will recognize that the command 1100 may be provided to the RAID primary data storage device 206a in a variety of manners that will fall within the scope of the present disclosure as well.

The method 600 then proceeds to block 608 where the RAID primary data storage device involved in the primary data update performs parity data generation offload operations. In an embodiment, at block 608, the RAID data storage engine 304 in the RAID data storage device 206a/300 may receive the parity data generation offload command 1100 via its communication system 308 and, in response, may perform the parity data generation offload operations discussed below with regard to the method 700. For example, the RAID storage engine 304 in the RAID primary data storage device 206a/300 may respond to the ringing of its doorbell by accessing the command 1100 in the submission queue in its communication system 310, which may cause the RAID storage engine 304 in the RAID primary data storage device 206a/300 to operate as per the method 700 discussed below. In embodiments in which the command 1100 is a multi-operation command, the RAID storage engine 304 in the RAID primary data storage device 206a/300 may identify the multiple operations instructed by that command 1100 (as described in U.S. patent application Ser. No. 16/585,296, filed on Sep. 27, 2019.)

The method 700 begins at decision block 702 where the method 700 proceeds based on whether the RAID primary data storage device is involved in the primary data update. As discussed above (and in further detail below), RAID primary data storage devices that are involved in a primary data update, as well as RAID primary data storage devices that are not involved in that primary data update, may act as "parity data generation proxies" to offload parity data generation from a RAID parity data storage device involved in that primary data update, and the method 700 may proceed differently based on which situation is occurring.

Figure 11B:
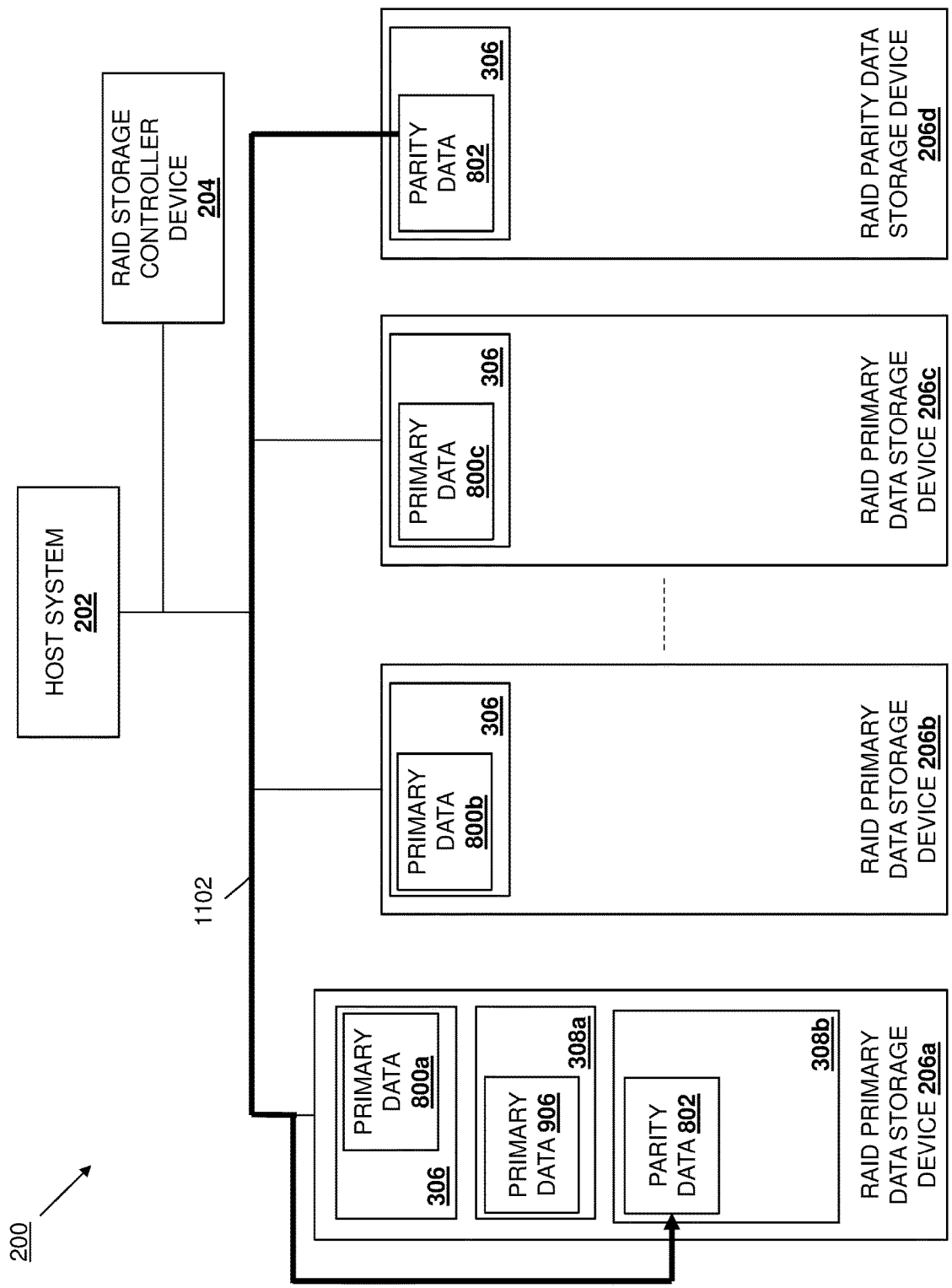
FIG. 11B is a schematic view illustrating an embodiment of the RAID data storage system of FIG. 2 operating during the method of FIG. 6.

In this example, the RAID primary data storage is involved in the primary data update and, as such, the method 700 proceeds to block 704 where the RAID primary data storage device retrieves current parity data from the RAID parity data storage device. With reference to FIG. 11B, in an embodiment of block 704 and based on the command 1100 (which is a multi-operation command as described above in this embodiment), the RAID storage engine 304 in the RAID primary data storage device 206a/300 may operate to perform a parity data retrieval operation 1102 that accesses parity data 802 that is stored on the storage subsystem 306 in the RAID parity data storage device 206d and writes that parity data 802 to its second buffer subsystem 308b (e.g., in a CMB subsystem in the RAID primary data storage device 206a as described in the example above).

In one example, the parity data retrieval operation 1102 may include the RAID primary data storage device 206a instructing the RAID parity data storage device 206d to move the parity data 802 from its storage system 306 to its second buffer subsystem 308b, and then the RAID primary data storage device 206a performing a Direct Memory Access (DMA) operation to retrieve that parity data 802 directly from the second buffer subsystem 308b in the RAID parity data storage device 206d. However, in another example, the RAID primary data storage device 206a may retrieve the parity data 802 directly from the storage subsystem 306 in the RAID parity data storage device 206d using the teachings provided by the inventors of the present disclosure in U.S. patent application Ser. No. 16/838,224, filed on Apr. 2, 2020, the disclosure of which is incorporated herein by reference. As will be appreciated by one of skill in the art in possession of the present disclosure, the parity data 802 may be considered as "current parity data" that requires an update when the primary data 800a (e.g., "current primary data") is updated with the primary data 906 (e.g., "updated primary data") from the host system 202, although other primary data writing scenarios will fall within the scope of the present disclosure as well.

While this simplified example only provides one RAID primary data storage device involved in the primary data update, one of skill in the art in possession of the present disclosure will recognize that other RAID primary data storage devices in the RAID data storage system 200 may be involved in the primary data update (e.g., may update their current primary data with updated primary data during the primary data update) while remaining within the scope of the present disclosure. In such embodiment, those other RAID primary data storage devices may generate "interim parity data" via the performance of an XOR operation on their current primary data and updated primary data, and the RAID storage engine 304 in the RAID primary data storage device 206a/300 may operate to perform DMA operation similar to those discussed above to retrieve that interim parity data from those other RAID primary data storage devices as well. As will be recognized by one of skill in the art in possession of the present disclosure, the retrieval of interim parity data from each RAID data storage device that is involved a data update can become relatively intensive as more and more RAID data storage devices are involved in the updated. As such, while the examples described herein include only a single RAID data storage device in the data update for clarity of discussion, one of skill in the art in possession of the present disclosure will appreciate that the benefits of offloading of parity data generation operations from the RAID parity data storage device increase as the number of RAID data storage devices involved in the data update increases (and thus the number of interim parity data retrieval operations required as part of the parity data generation operations increases.)

Figure 11C:
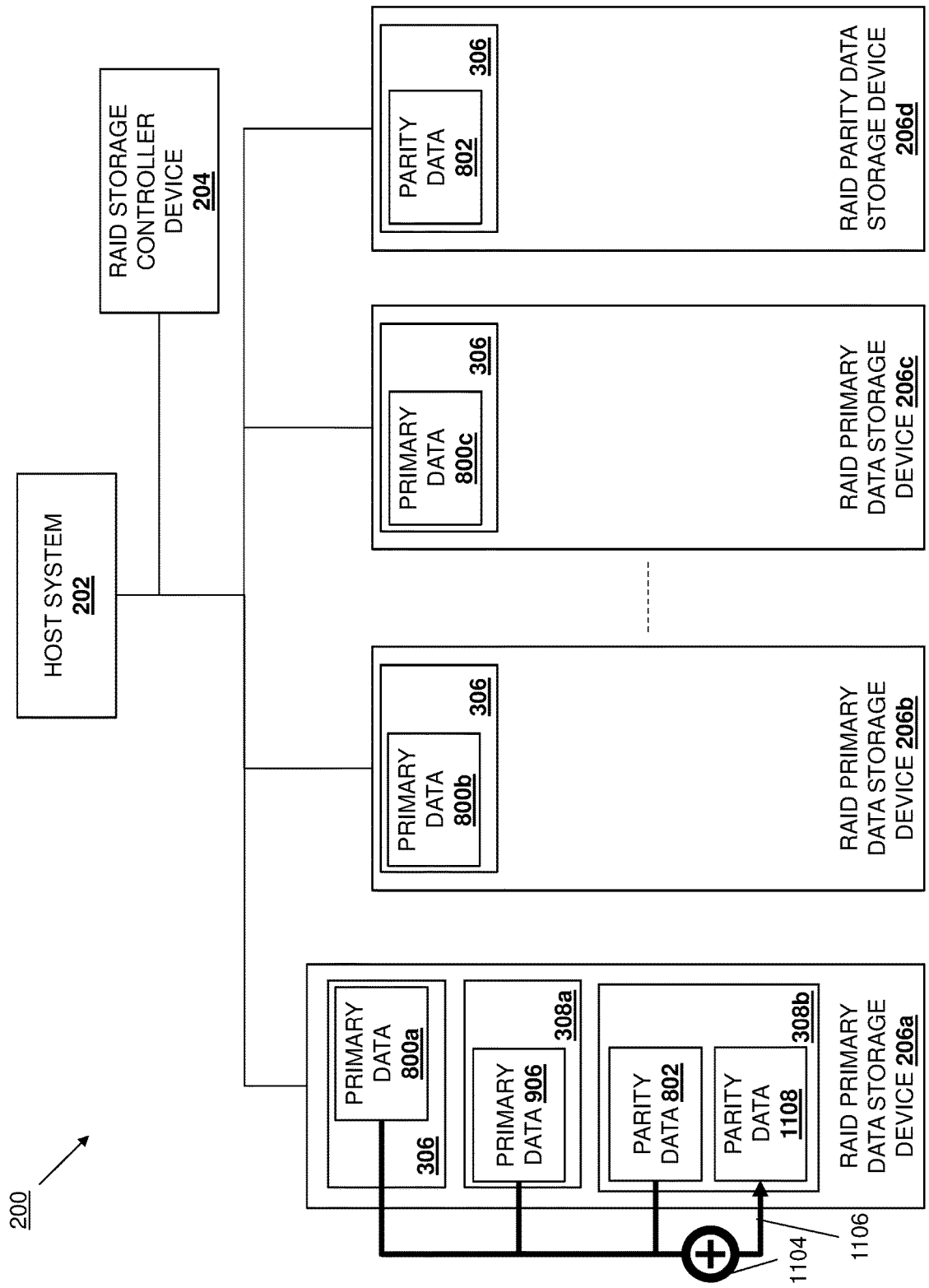
FIG. 11C is a schematic view illustrating an embodiment of the RAID data storage system of FIG. 2 operating during the method of FIG. 6.

The method 700 then proceeds to block 706 where the RAID primary data storage device performs XOR operations on current primary data, updated primary data, and current parity data to generate updated parity data. With reference to FIG. 11C, in an embodiment of block 706 and based on the command 1100 (which is a multi-operation command as described above in this embodiment), the RAID storage engine 304 in the RAID primary data storage device 206a/300 may operate to perform an XOR operation 1104 using the primary data 906 (e.g., "updated primary data") in its first buffer subsystem 308a, the primary data 800a (e.g., "current primary data") in its storage subsystem 306, and the parity data 802 (e.g., "current parity data") in its second buffer subsystem 308b, in order to produce parity data 1108, and then perform a write operation 1106 to write that parity data 1108 to its second buffer subsystem 308b (e.g., a CMB). As will be appreciated by one of skill in the art in possession of the present disclosure, the parity data 1108 may be considered as "updated parity data" that is required to update the parity data 802 (e.g., "current parity data") when the primary data 800a (e.g., "current primary data") is updated with the primary data 906 (e.g., "updated primary data") from the host system 202, although other primary data writing scenarios will fall within the scope of the present disclosure as well.

As discussed above, while this simplified example only provides one RAID primary data storage device involved in the primary data update, other RAID primary data storage devices in the RAID data storage system 200 may be involved in the primary data update and may have generated "interim parity data" that was retrieved by the RAID primary data storage device 206a/300. In such situations, one of skill in the art in possession of the present disclosure will recognize that the XOR operations at block 706 may be performed on the current primary data, the updated primary data, the current parity data, and the interim parity data, in order to generate the updated parity data.

Figure 11D:
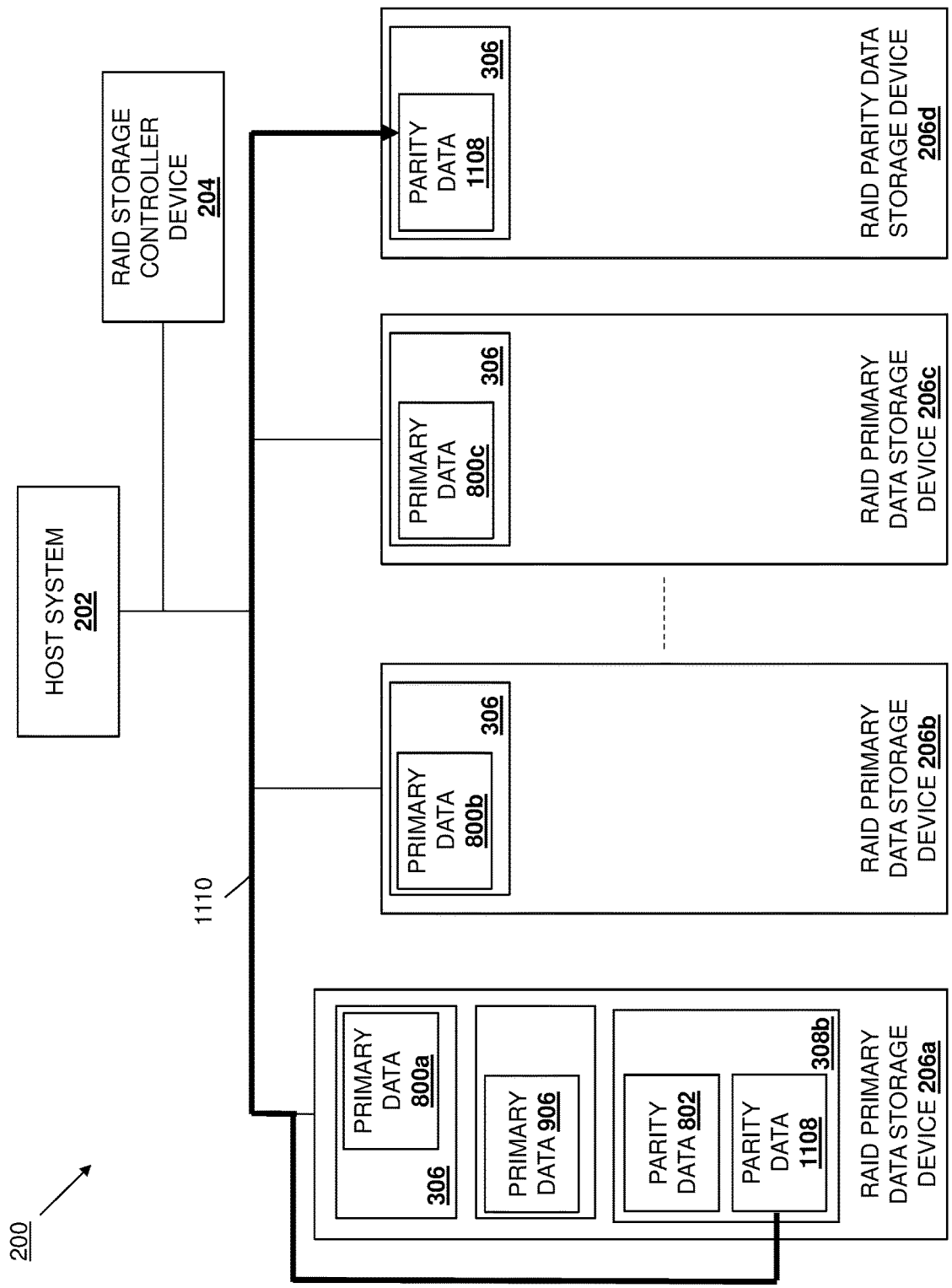
FIG. 11D is a schematic view illustrating an embodiment of the RAID data storage system of FIG. 2 operating during the method of FIG. 6.

The method 700 then proceeds to block 708 where the RAID primary data storage device transmits the updated parity data to the RAID parity data storage device. With reference to FIG. 11D, in an embodiment of block 708 and based on the command 1100 (which is a multi-operation command as described above in this embodiment), the RAID storage engine 304 in the RAID primary data storage device 206a/300 may operate to perform a parity data transmission operation 1110 that transmits the parity data 1108 (e.g., "updated parity data") that is stored on its second buffer subsystem 308b to the RAID parity data storage device 206d, and one of skill in the art in possession of the present disclosure will appreciate how, upon receiving the parity data 1110, the RAID parity data storage device 206d may overwrite the parity data 802 (e.g., "current parity data") in its storage subsystem 306 with the parity data 1108 (e.g., updated parity data"). In one example, the parity data transmission operation 1110 may include the RAID primary data storage device 206a writing the parity data 1108 from its second buffer subsystem 306 to the second buffer subsystem 308b in the RAID parity data storage device 206d, and the RAID parity data storage device 206d overwriting the parity data 802 in its storage subsystem 306 with the parity data 1108 in its second buffer subsystem 308b. However, in another example, the RAID primary data storage device 206a may provide the parity data 1108 directly to the storage subsystem 306 in the RAID parity data storage device 206d using the teachings provided by the inventors of the present disclosure in U.S. patent application Ser. No. 16/838,224 filed on Apr. 2, 2020, the disclosure of which is incorporated herein by reference.

Figure 11E:
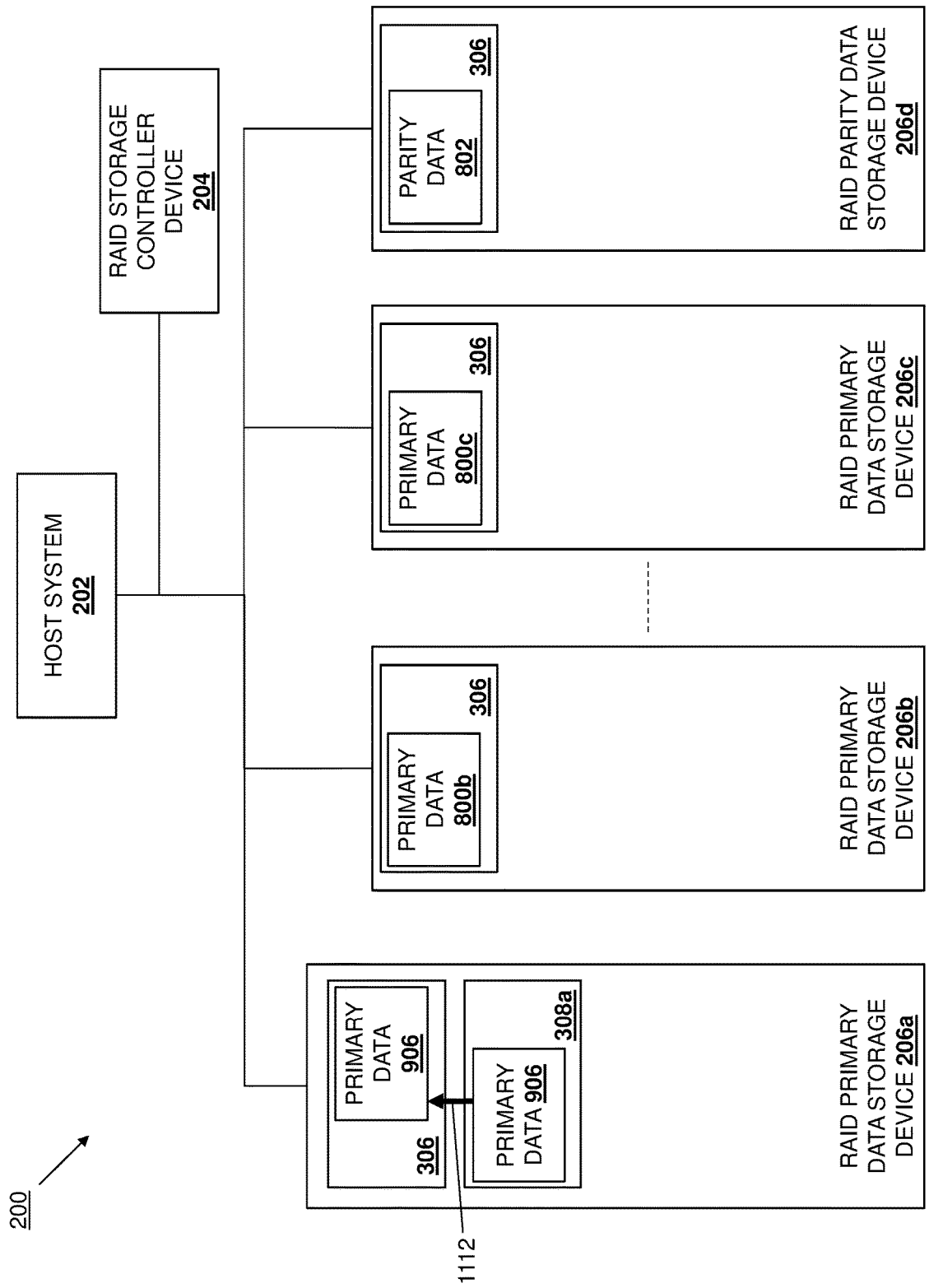
FIG. 11E is a schematic view illustrating an embodiment of the RAID data storage system of FIG. 2 operating during the method of FIG. 6.

The method 700 then proceeds to block 710 where the RAID primary data storage device updates the current primary data with the updated primary data. With reference to FIG. 11E, in an embodiment of block 710 and based on the command 1100 (which is a multi-operation command as described above in this embodiment), the RAID storage engine 304 in the RAID primary data storage device 206a/300 may operate to perform a primary data overwrite operation 1112 that overwrites the primary data 906 (e.g., "current primary data") that is stored on its storage subsystem 306 with the primary data 906 (e.g., "updated primary data") that is stored in its first buffer subsystem 308a, thus updating the primary data on the RAID primary data storage device 206a.

Figure 11F:
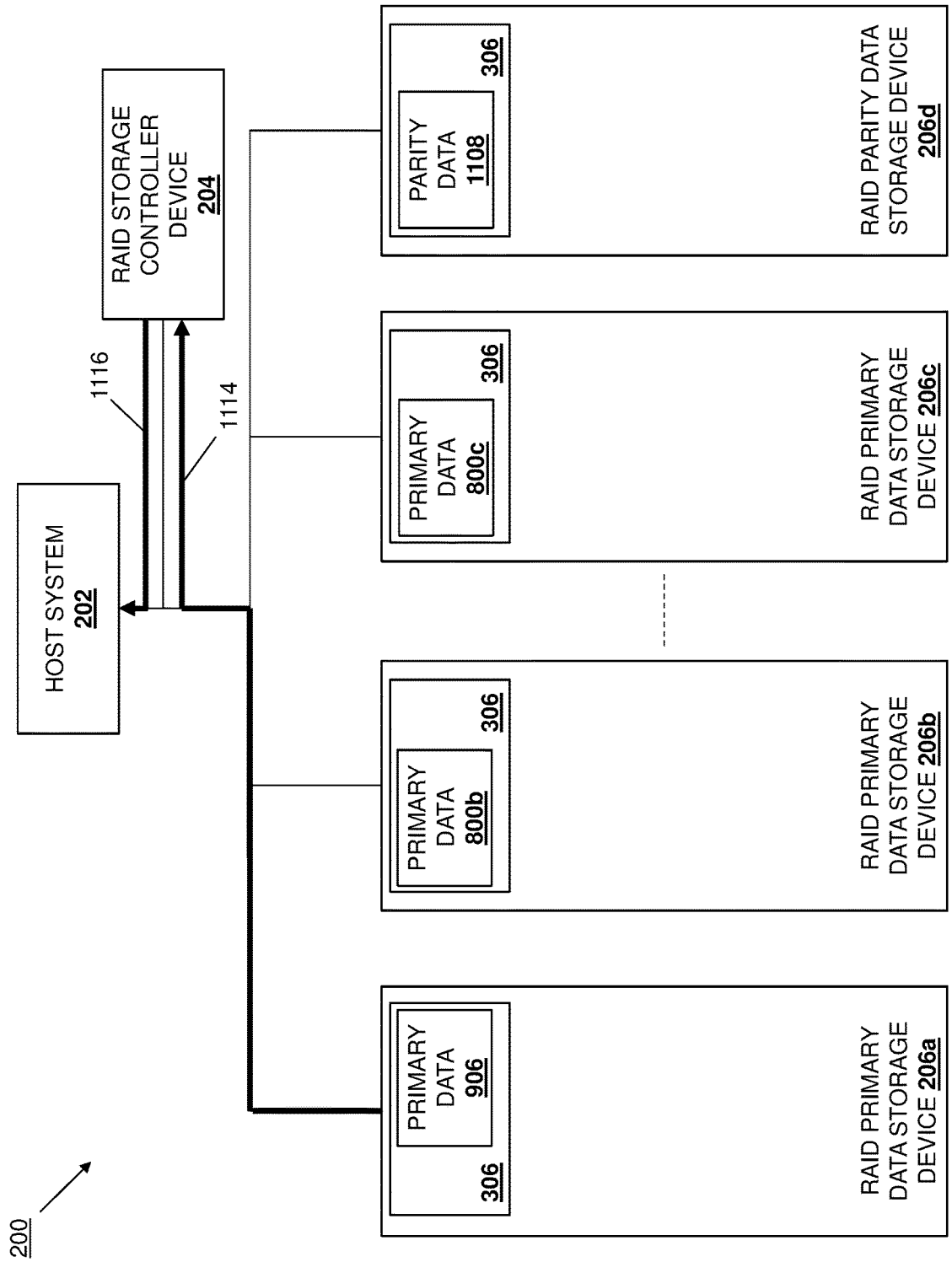
FIG. 11F is a schematic view illustrating an embodiment of the RAID data storage system of FIG. 2 operating during the method of FIG. 6.

With reference to FIG. 11F, following completion of the operations associated with the command 1100 (e.g., multiple operations associated with a multi-operation command as discussed above, following each operation associated with respective commands, etc.) the RAID storage engine 304 in the RAID primary data storage device 206a/300 may generate and transmit a completion message 1114 to the RAID storage controller device 204. For example, the RAID storage engine 304 in the RAID parity data storage device 206a/300 may generate the completion message 1114 and provide that completion message in a completion queue in its communication system 310, and then generate an interrupt to the RAID storage controller device 204 that causes the RAID storage controller device 204 to access that completion queue and retrieve the completion message. However, while a specific technique for transmitting the completion message is described, one of skill in the art in possession of the present disclosure will recognize that completion messages may be transmitted using a variety of other techniques while remaining within the scope of the present disclosure. As also illustrated in FIG. 11F, following the receiving of the completion message 1114, the RAID storage controller device 204 may generate and transmit a completion message 1116 to the host system 202 in order to indicate to the host system that the write command 900 has been completed.

As will be appreciated by one of skill in the art in possession of the present disclosure, the parity data generation offload operations performed by the "proxy" RAID primary data storage device 206a for the RAID parity data storage device 206d offloads those operations from the "over-loaded" RAID parity data storage device 206d, and may provide load-balancing in the RAID storage system 200, particularly when the methods 600 and 700 are performed for many "over-loaded" RAID data storage devices by RAID data storage devices with relatively low loads.

Returning to method 600, if at decision block 604 it is determined that the RAID parity data storage device loading does not exceed the first loading threshold, the method 600 proceeds to decision block 610 where it is determined whether the RAID parity data storage device loading exceeds a second loading threshold. As discussed above, at or prior to decision block 604, the RAID storage controller engine 404 in the RAID storage controller device 204/400 may operate to track the loading of RAID data storage devices in the RAID data storage system 200, as well as RAID data storage devices in RAID data storage system(s) that are separate from the RAID data storage system 200.

For example, FIG. 12 illustrates the RAID data storage device database 407/500 subsequent to the tracking of the loading of the RAID data storage devices 206a, 206b, 206c, and 206d. One of skill in the art in possession of the present disclosure will recognize how, in the illustrated example of the relative RAID data storage device load tracking table 516, a "COMMAND 50" includes an 8 KB write operation (corresponding to a random write operation) to the RAID data storage device 206a, which corresponds to a relative RAID data storage device command execution time of "7" for random write operations 514 performed on a mixed-use RAID data storage device 504b in the enterprise class RAID data storage device 504 in the relative RAID data storage device command estimated execution time table 502, and provides a relative RAID data storage device command execution time of "14" (e.g., two random write operations, each with a relative RAID data storage device command execution time of "7") for the RAID data storage device 206a in the relative RAID data storage device load tracking table 516.

Similarly, in the illustrated example of the relative RAID data storage device load tracking table 516, a "COMMAND 51" includes 128 KB write operations (corresponding to two 64 KB sequential write operations) to the RAID data storage devices 206a and 206d, which corresponds to relative RAID data storage device command execution times of "35" for sequential write operations 510 performed on a mixed-use RAID data storage device 504b in the enterprise class RAID data storage device 504 in the relative RAID data storage device command estimated execution time table 502, and provides relative RAID data storage device command execution times of "35" for each of the RAID data storage devices 206a and 206d in the relative RAID data storage device load tracking table 516.

Similarly, in the illustrated example of the relative RAID data storage device load tracking table 516, a "COMMAND 52" includes 4 KB read operations (corresponding to a random read operations) to the RAID data storage device 206c, which corresponds to a relative RAID data storage device command execution time of "2" for random read operations 512 performed on a mixed-use RAID data storage device 504b in the enterprise class RAID data storage device 504 in the relative RAID data storage device command estimated execution time table 502, and provides a relative RAID data storage device command execution time of "2" for the RAID data storage device 206c in the relative RAID data storage device load tracking table 516.

Similarly, in the illustrated example of the relative RAID data storage device load tracking table 516, a "COMMAND 3" includes 256 KB write operations (corresponding to four 64 KB sequential read operations) to the RAID data storage devices 206a, 206b, 206c, and 206d, which corresponds to a relative RAID data storage device command execution time of "20" for sequential read operations 510 performed on a mixed-use RAID data storage device 504b in the enterprise class RAID data storage device 504 in the relative RAID data storage device command estimated execution time table 502, and provides a relative RAID data storage device command execution time of "20" for each of the RAID data storage devices 206a, 206b, 206c, and 206d in the relative RAID data storage device load tracking table 516.

Similarly, in the illustrated example of the relative RAID data storage device load tracking table 516, a "COMMAND 54" includes a 1 KB read operation (corresponding to random read operations) to the RAID data storage device 206c, which corresponds to a relative RAID data storage device command execution time of "2" for random read operations 512 performed on a mixed-use RAID data storage device 504b in the enterprise class RAID data storage device 504 in the relative RAID data storage device command estimated execution time table 502, and provides a relative RAID data storage device command execution time of "0.5" (e.g., ¼ of a random read operation with a relative RAID data storage device command execution time of "2") for the RAID data storage device 206c in the relative RAID data storage device load tracking table 516.

Thus, the total row 522 that tracks the total or sum of the estimated command execution times for RAID data storage devices 206a-206d in the example of the relative RAID data storage device load tracking table 516 illustrated in FIG. 12 includes total estimated command execution times of "69" for the RAID data storage device 206a, "20" for the RAID data storage device 206b, "20.5" for the RAID data storage device 206c, and "57" for the RAID data storage device 206d. Similarly as described above, similar relative RAID data storage device load tracking tables may be maintained for other RAID data storage systems (i.e., other RAIDsets that are coupled to the RAID data storage system 200) in order to track the loading of the RAID data storage devices in those RAID data storage systems, and may be accessible to the RAID storage controller device 204. For example, each RAID data storage device in any number of RAID data storage systems may maintain a respective relative RAID data storage device load tracking table for the RAID data storage devices in its RAID data storage system, and may share that relative RAID data storage device load tracking table with other RAID storage controller devices to which it is connected.

Thus, in an embodiment of decision block 610, the RAID storage controller engine 404 in the RAID storage controller device 204/400 may utilize the relative RAID data storage device load tracking table 516 in order to determine whether the RAID parity data storage device loading exceeds the second loading threshold. In a specific embodiment, the second loading threshold may be relative to the third and fourth groups of RAID data storage devices discussed above that include RAID primary data storage devices that are included in the RAID data storage system that is involved in the primary data update but that are not actually involved in the primary data update, as well as RAID primary data storage devices that are not included in the RAID data storage system that is involved in the primary data update, and may include a determination by the RAID storage controller engine 404 in the RAID storage controller device 204/400 of whether the RAID parity data storage device 206d is loaded some threshold percentage greater than the RAID primary data storage devices that are not involved in the primary data update.

Thus, continuing with the specific example provided above, at decision block 610, the RAID storage controller engine 404 in the RAID storage controller device 204/400 may determine whether the total estimated command execution time for the RAID parity data storage device 206d (e.g., "57" in the illustrated example) is some threshold percentage greater than the total estimated command execution time for the RAID primary data storage device 206b (e.g., "20" in the illustrated example), the RAID primary data storage device 206c (e.g., "20.5" in the illustrated example), and/or any RAID primary data storage device in a RAID data storage system that is different than the RAID data storage system 200 (not illustrated). As will be appreciated by one of skill in the art in possession of the present disclosure, the second loading threshold may be selected based on any criteria, and may include absolute times and/or any other measurements (rather than the threshold percentage discussed above) while remaining within the scope of the present disclosure as well.

Figure 13A:
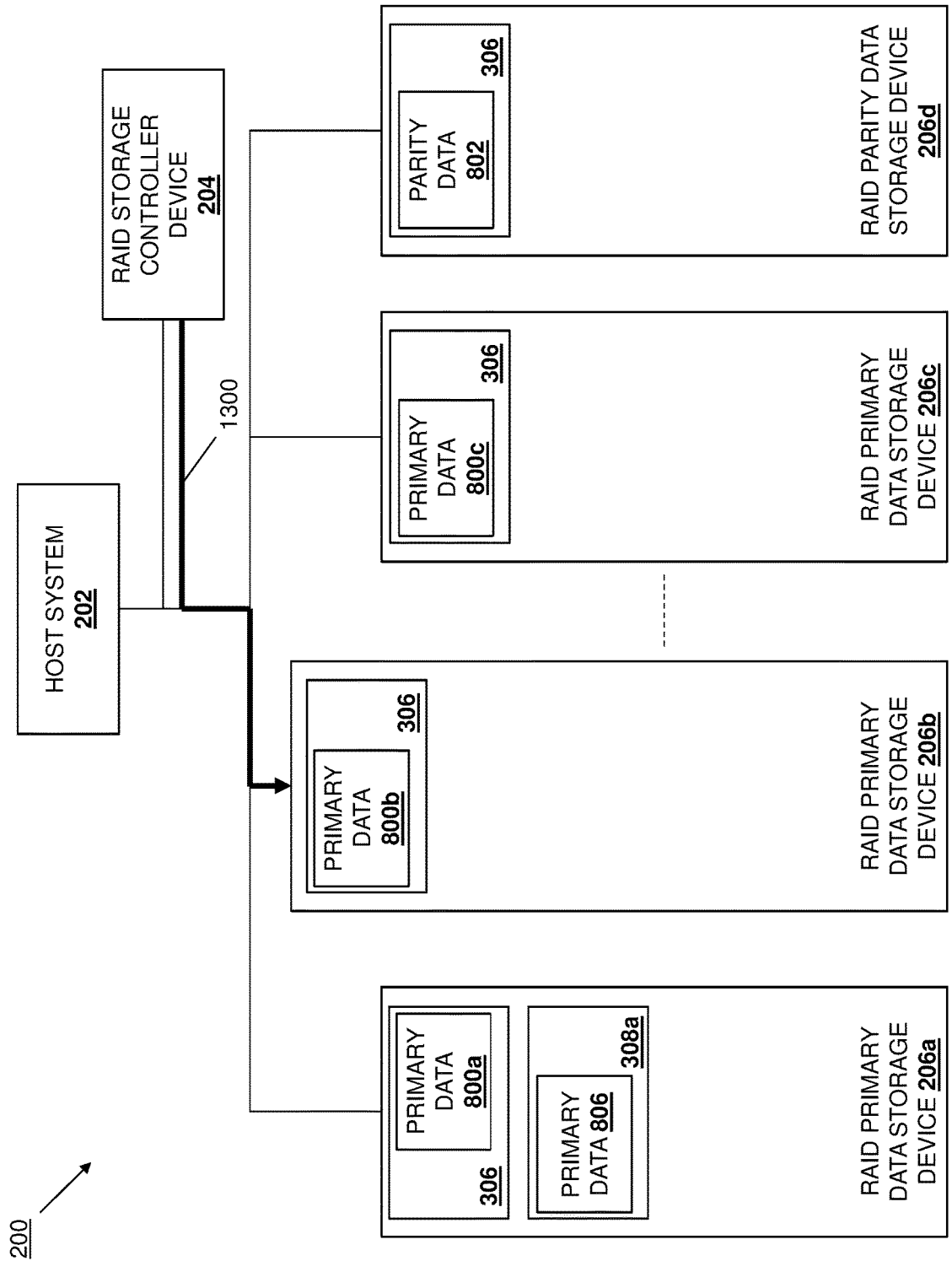
FIG. 13A is a schematic view illustrating an embodiment of the RAID data storage system of FIG. 2 operating during the method of FIG. 6.

If, at decision block 610, it is determined that the RAID parity data storage device loading exceeds the second loading threshold, the method 600 proceeds to block 612 where the RAID storage controller device selects a RAID primary data storage device that is not involved in the primary data update for performing a parity data update and transmits a parity data generation offload command. In an embodiment, at block 612, the RAID storage controller engine 404 in the RAID storage controller device 204/400 may determine that the total estimated command execution time for the RAID parity data storage device 206d (e.g., "57" in the illustrated example) is some threshold percentage greater than the total estimated command execution times for the RAID primary data storage device 206b (e.g., "20" in the illustrated example) and the RAID primary data storage device 206c (e.g., "20.5" in the illustrated example) and, in response, may select the RAID primary data storage device 206b for performing a parity data update (e.g., due to its lower total estimated command execution time), and generate a parity data generation offload command. With reference to FIG. 13A, the RAID storage controller engine 404 in the RAID storage controller device 204/400 may then transmit the parity data generation offload command 1300 via its communication system 408 to the RAID primary data storage device 206a. However, while the RAID data storage device 206b that is included in the RAID data storage system 200 that is involved in the parity data update is described as being selected to perform the parity data generation offload operations, one of skill in the art in possession of the present disclosure will recognize that a RAID primary data storage device that is included in a RAID data storage system that is not involved in the primary data update may be selected to perform the parity data generation offload operations, and may perform those parity data generation offload operations, in substantially the same manners described for the RAID primary data storage device 206b below.

In some embodiments, the parity data generation offload command 1300 may be a multi-operation command like those described in U.S. patent application Ser. No. 16/585,296, filed on Sep. 27, 2019. For example, the command 1300 may be a PARITY GENERATION OFFLOAD multi-operation command that is configured to cause the RAID primary data storage device 206b to perform the multiple operations described below. However, while described as providing a multi-operation command at block 612, one of skill in the art in possession of the present disclosure will recognize that the multiple operations performed by the RAID primary data storage device 206b discussed below may be performed in response to respective commands transmitted by the RAID storage controller device 204 while remaining within the scope of the present disclosure as well. In a specific example, the transmission of the command 1300 may include the RAID storage controller device 204 providing the command 1300 in a submission queue that is included in the communication system 310 in the RAID primary data storage device 206b/300, and then ringing a doorbell for the RAID primary data storage device 206b/300. However, one of skill in the art in possession of the present disclosure will recognize that the command 1300 may be provided to the RAID primary data storage device 206b in a variety of manners that will fall within the scope of the present disclosure as well.

The method 600 then proceeds to block 614 where the RAID primary data storage device that is not involved in the primary data update performs parity data generation offload operations. In an embodiment, at block 614, the RAID data storage engine 304 in the RAID data storage device 206b/300 may receive the parity data generation offload command 1300 via its communication system 308 and, in response, may perform the parity data generation offload operations discussed below with regard to the method 700. For example, the RAID storage engine 304 in the RAID primary data storage device 206b/300 may respond to the ringing of its doorbell by accessing the command 1300 in the submission queue in its communication system 310, which may cause the RAID storage engine 304 in the RAID primary data storage device 206b/300 to operate as per the method 700 discussed below. In embodiments in which the command 1300 is a multi-operation command, the RAID storage engine 304 in the RAID primary data storage device 206b/300 may identify the multiple operations instructed by that command 1300 (as described in U.S. patent application Ser. No. 16/585,296, filed on Sep. 27, 2019.)

Figure 13B:
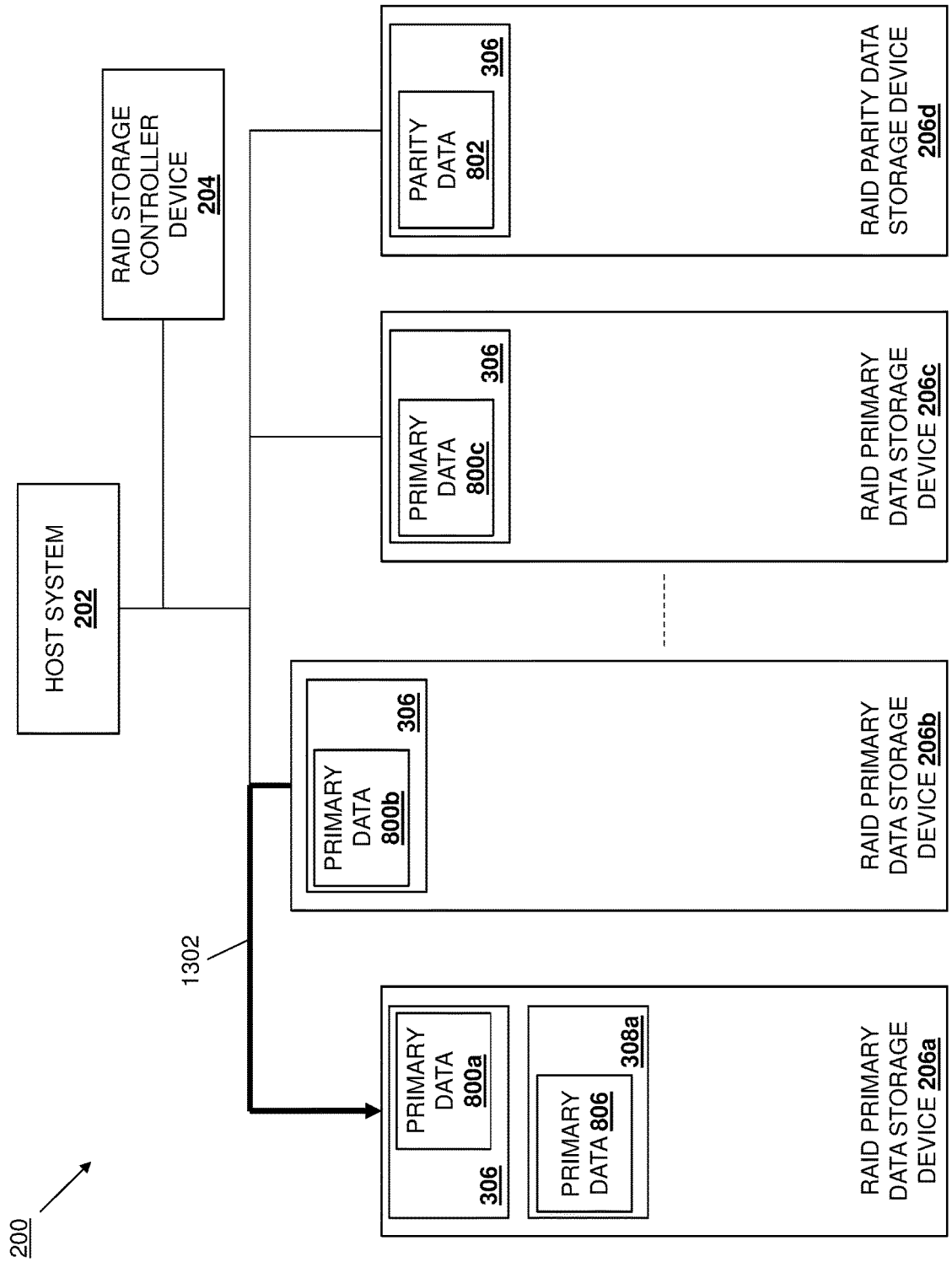
FIG. 13B is a schematic view illustrating an embodiment of the RAID data storage system of FIG. 2 operating during the method of FIG. 6.
Figure 13C:
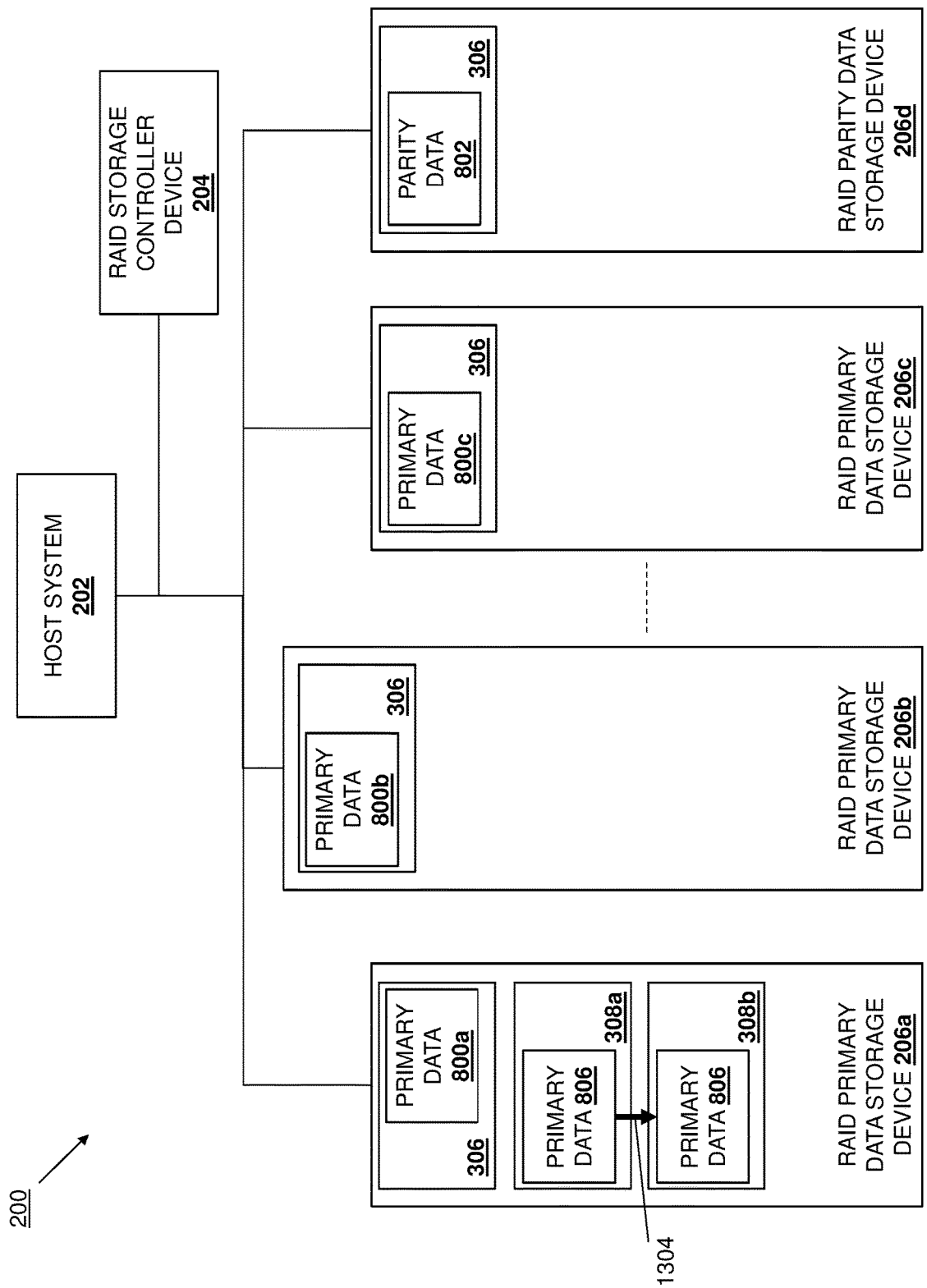
FIG. 13C is a schematic view illustrating an embodiment of the RAID data storage system of FIG. 2 operating during the method of FIG. 6.

As discussed above (and in further detail below), both RAID primary data storage devices that are involved in a primary data update and RAID primary data storage devices that are not involved in that primary data update may act as "parity data generation proxies" to offload parity data generation from a RAID parity data storage device involved in that primary data update, and the method 700 may proceed differently based on which situation is occurring. In this example, the RAID primary data storage device 206b is not involved in the primary data update and, as such, the method 700 proceeds to block 714 where the RAID primary data storage device retrieves current primary data and updated primary data. With reference to FIG. 13B, at block 714, the RAID data storage engine 304 in the RAID data storage device 206b/300 may generate and transmit a primary data copy command 1302 to the RAID primary data storage device 206a that, as illustrated in FIG. 13C causes the primary data storage device 206a to perform primary data copy operations 1304 that copy the primary data 806 from its first buffer subsystem 308a (e.g., a device buffer subsystem) to its second buffer subsystem 308b (e.g., a CMB subsystem).

Figure 13D:
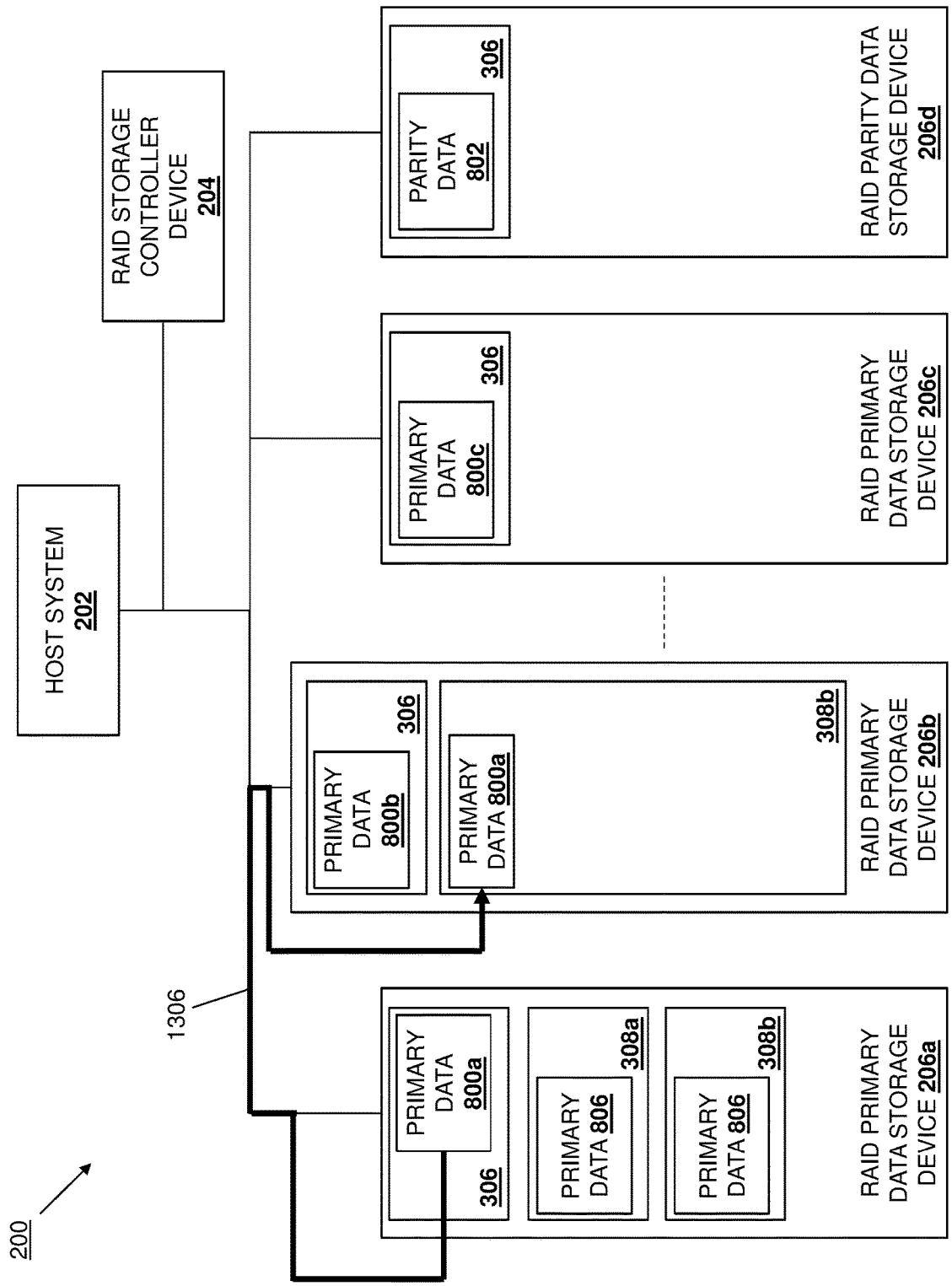
FIG. 13D is a schematic view illustrating an embodiment of the RAID data storage system of FIG. 2 operating during the method of FIG. 6.

With reference to FIG. 13D, in an embodiment of block 714 and based on the command 1300 (which is a multi-operation command as described above in this embodiment), the RAID storage engine 304 in the RAID primary data storage device 206b/300 may operate to perform a primary data retrieval operation 1306 that accesses the primary data 800a that is stored on the storage subsystem 306 in the RAID parity data storage device 206a and writes that primary data 800a to its second buffer subsystem 308b (e.g., in a CMB subsystem in the RAID primary data storage device 206b as described in the example above).

Figure 13E:
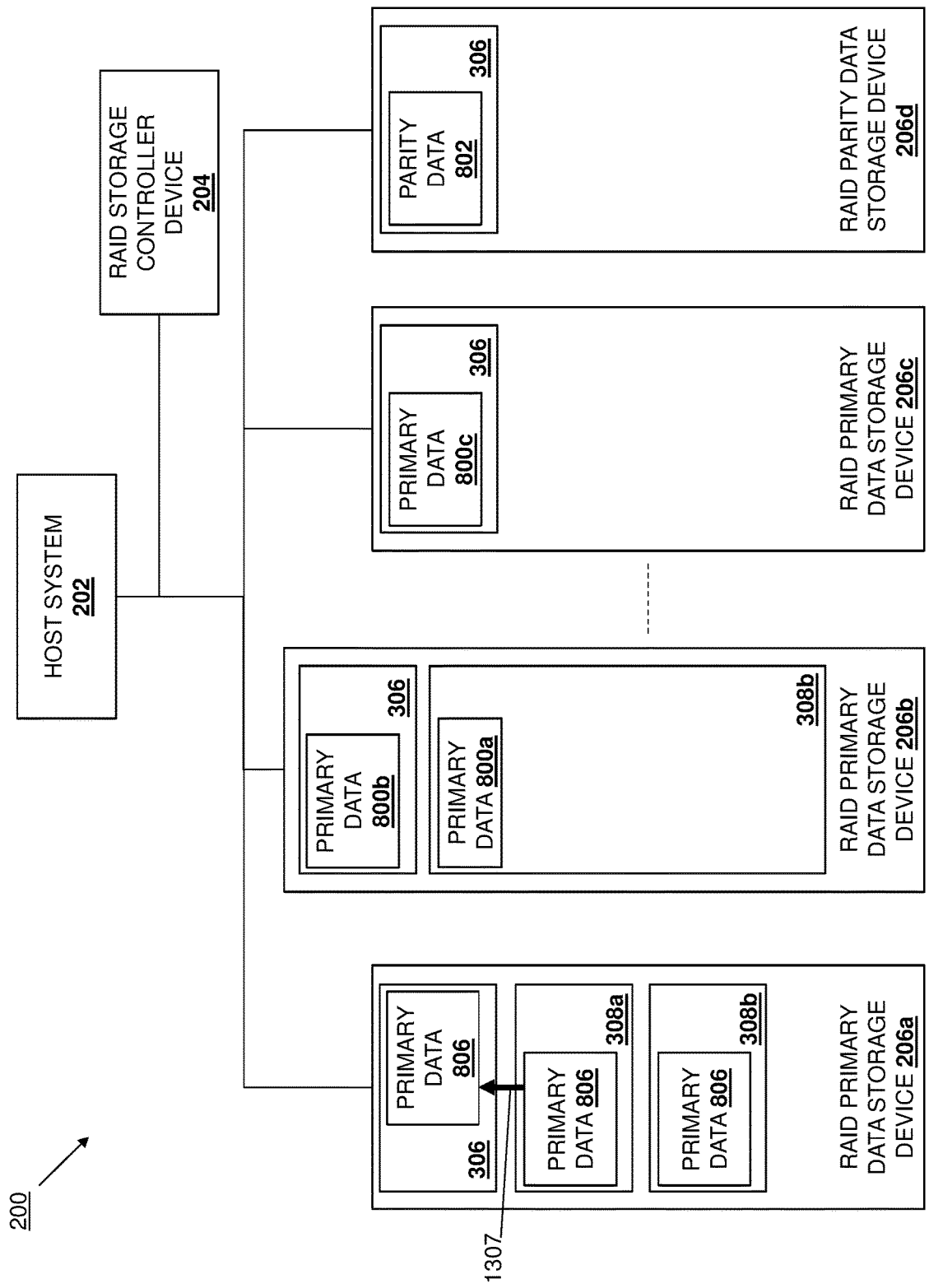
FIG. 13E is a schematic view illustrating an embodiment of the RAID data storage system of FIG. 2 operating during the method of FIG. 6.

In one example, the primary data retrieval operation 1306 may include the RAID primary data storage device 206b instructing the RAID primary data storage device 206a to move the primary data 800a from its storage system 306 to its second buffer subsystem 308b, and then the RAID primary data storage device 206b performing a Direct Memory Access (DMA) operation to retrieve that primary data 800a directly from the second buffer subsystem 308b in the RAID primary data storage device 206a. However, in another example, the RAID primary data storage device 206b may retrieve the primary data 800a directly from the storage subsystem 306 in the RAID primary data storage device 206a using the teachings provided by the inventors of the present disclosure in U.S. patent application Ser. No. 16/838,224, filed on Apr. 2, 2020, the disclosure of which is incorporated herein by reference. As will be appreciated by one of skill in the art in possession of the present disclosure, the primary data 800a may be considered as "current primary data". As will be appreciated by one of skill in the art in possession of the present disclosure, following the writing of the primary data 800a to the second buffer subsystem 308b in the RAID primary data storage device 206b, the RAID primary data storage device 206a may operate to perform overwrite operations 1307 that overwrite the primary data 800a (e.g., "current" primary data) in its storage subsystem 306 with the primary data 806 (e.g., "updated" primary data) in its first buffer subsystem 308a, as illustrated in FIG. 13E.

Figure 13F:
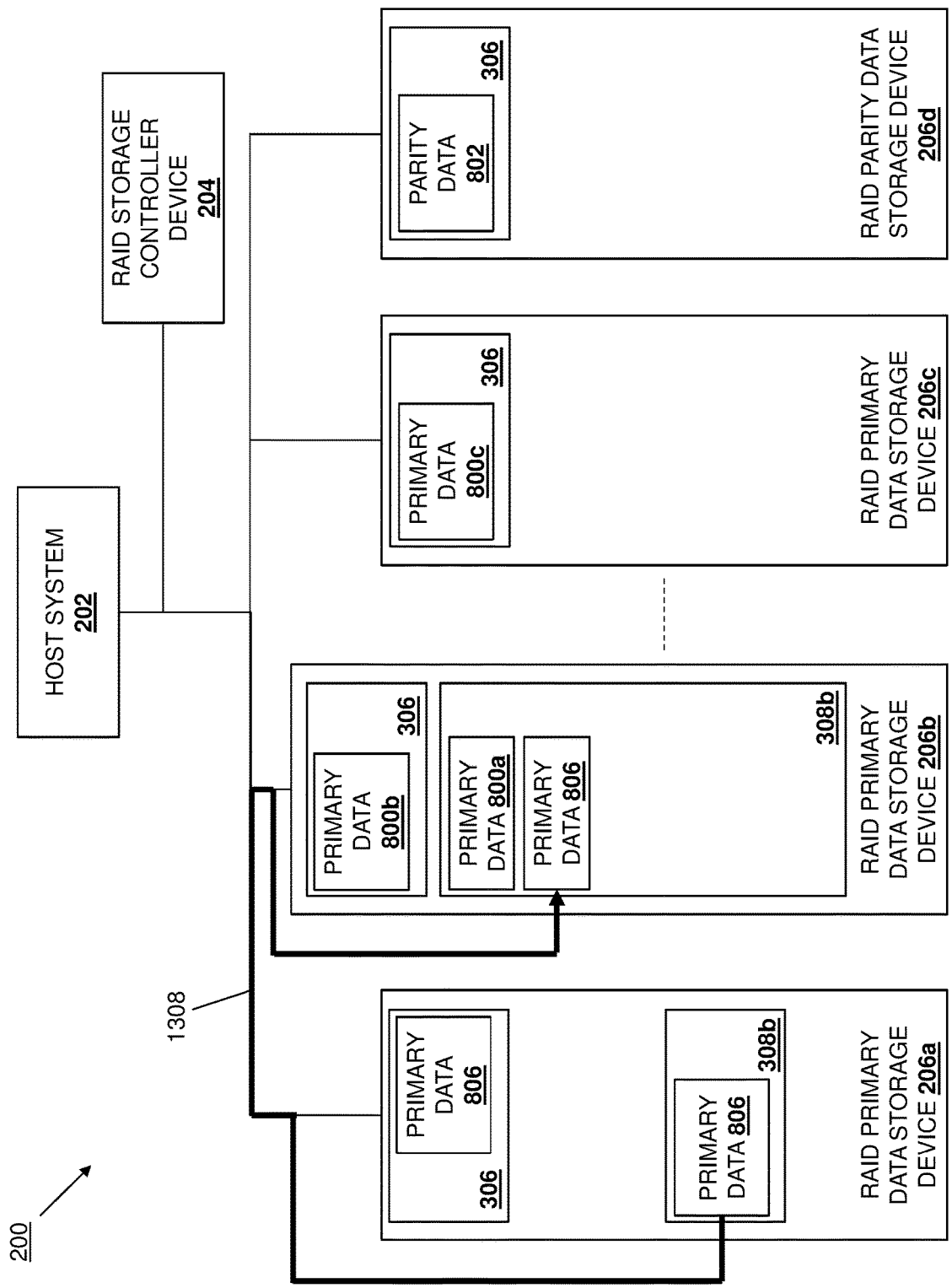
FIG. 13F is a schematic view illustrating an embodiment of the RAID data storage system of FIG. 2 operating during the method of FIG. 6.

With reference to FIG. 13F, in an embodiment of block 714 and based on the command 1300 (which is a multi-operation command as described above in this embodiment), the RAID storage engine 304 in the RAID primary data storage device 206b/300 may operate to perform a Direct Memory Access (DMA) operation 1308 that accesses the primary data 806 that is stored on the second buffer subsystem 308b in the RAID parity data storage device 206a and writes that primary data 806 to its second buffer subsystem 308b (e.g., in a CMB subsystem in the RAID primary data storage device 206b as described in the example above). As will be appreciated by one of skill in the art in possession of the present disclosure, the primary data 806 may be considered as "updated primary data" that is provided to update the primary data 500b (e.g., "current primary data"), although other primary data writing scenarios will fall within the scope of the present disclosure as well.

Figure 13G:
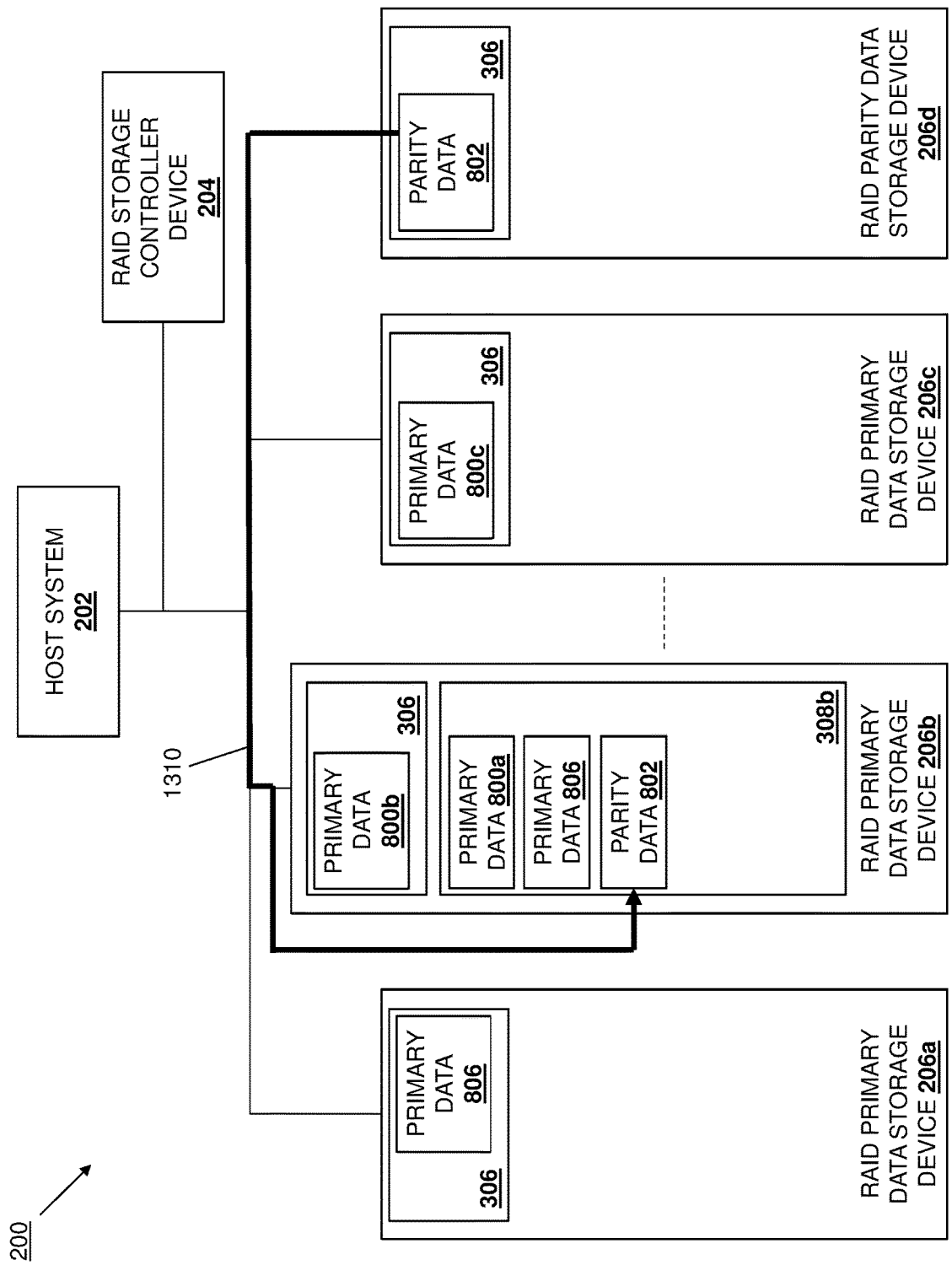
FIG. 13G is a schematic view illustrating an embodiment of the RAID data storage system of FIG. 2 operating during the method of FIG. 6.

The method 700 then proceeds to block 714 where the RAID primary data storage device retrieves current parity data from the RAID parity data storage device. With reference to FIG. 13G, in an embodiment of block 714 and based on the command 1300 (which is a multi-operation command as described above in this embodiment), the RAID storage engine 304 in the RAID primary data storage device 206b/300 may operate to perform a parity data transmission operation 1310 that accesses the parity data 802 that is stored on the storage subsystem 306 in the RAID parity data storage device 206d and writes that parity data 802 to its second buffer subsystem 308b (e.g., in a CMB subsystem in the RAID primary data storage device 206b as described in the example above).

In one example, the parity data retrieval operation 1310 may include the RAID primary data storage device 206b instructing the RAID parity data storage device 206d to move the parity data 802 from its storage system 306 to its second buffer subsystem 308b, and then the RAID primary data storage device 206b performing a Direct Memory Access (DMA) operation to retrieve that parity data 802 directly from the second buffer subsystem 308b in the RAID parity data storage device 206d. However, in another example, the RAID primary data storage device 206b may retrieve the parity data 802 directly from the storage subsystem 306 in the RAID parity data storage device 206d using the teachings provided by the inventors of the present disclosure in U.S. patent application Ser. No. 16/838,224, filed on Apr. 2, 2020, the disclosure of which is incorporated herein by reference. As will be appreciated by one of skill in the art in possession of the present disclosure, the parity data 802 may be considered as "current parity data" that requires an update when the primary data 800a (e.g., "current primary data") is updated with the primary data 806 (e.g., "updated primary data") from the host system 202, although other primary data writing scenarios will fall within the scope of the present disclosure as well.

While this simplified example only provides one RAID primary data storage device involved in the primary data update, one of skill in the art in possession of the present disclosure will recognize that other RAID primary data storage devices in the RAID data storage system 200 may be involved in the primary data update (e.g., may update their current primary data with updated primary data during the primary data update) while remaining within the scope of the present disclosure. In such embodiment, those other RAID primary data storage devices may generate "interim parity data" via the performance of an XOR operation on their current primary data and updated primary data, and the RAID storage engine 304 in the RAID primary data storage device 206B/300 may operate to perform DMA operation similar to those discussed above to retrieve that interim parity data from those other RAID primary data storage devices as well.

Figure 13H:
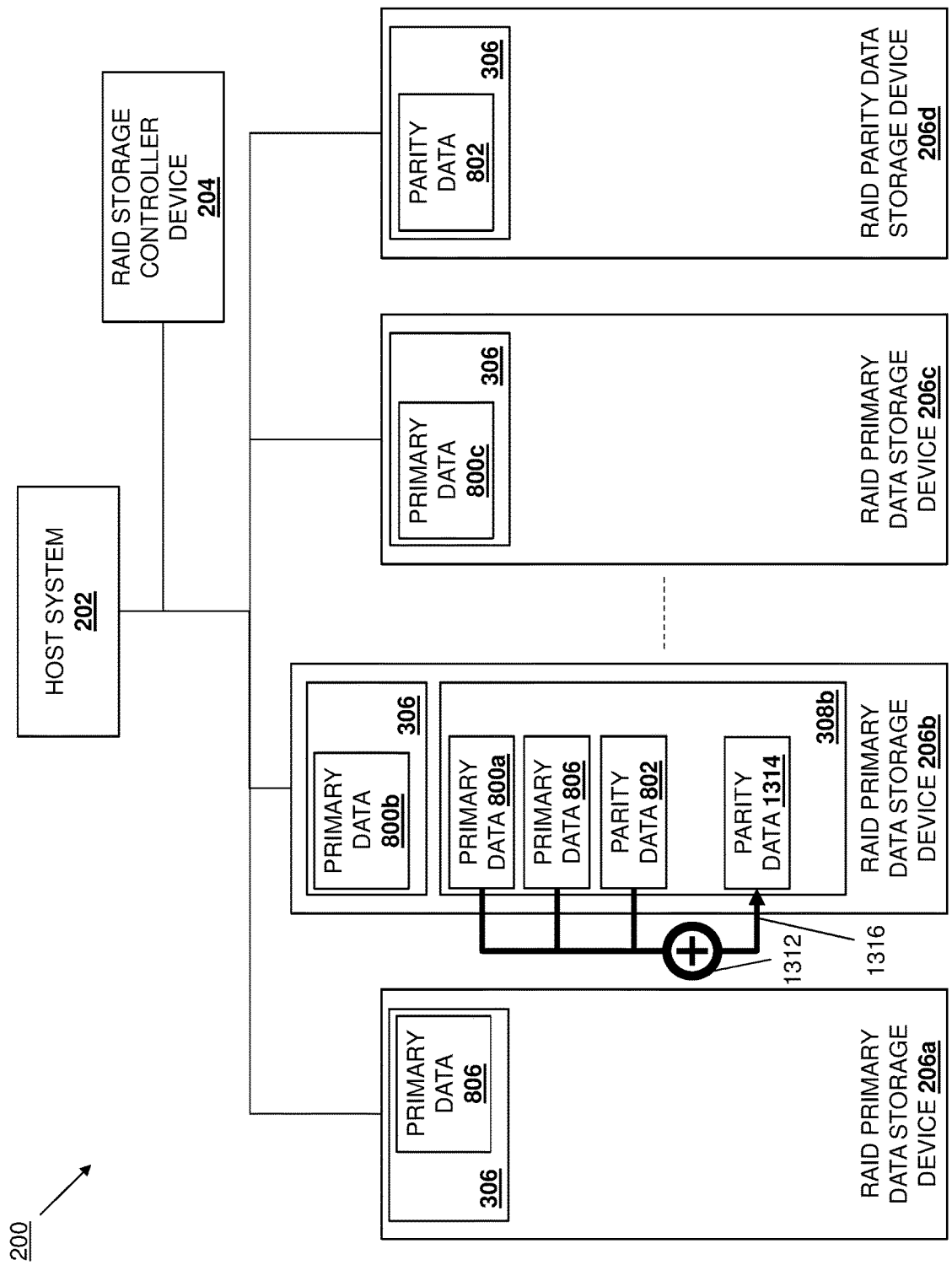
FIG. 13H is a schematic view illustrating an embodiment of the RAID data storage system of FIG. 2 operating during the method of FIG. 6.

The method 700 then proceeds to block 716 where the RAID primary data storage device performs XOR operations on current primary data, updated primary data, and current parity data to generate updated parity data. With reference to FIG. 13H, in an embodiment of block 716 and based on the command 1300 (which is a multi-operation command as described above in this embodiment), the RAID storage engine 304 in the RAID primary data storage device 206b/300 may operate to perform an XOR operation 1312 using the primary data 806 (e.g., "updated primary data") in its second buffer subsystem 308b, the primary data 800a (e.g., "current primary data") in its second buffer subsystem 308b, and the parity data 802 (e.g., "current parity data") in its second buffer subsystem 308b, in order to produce parity data 1314, and then perform a write operation 1316 to write that parity data 1314 to its second buffer subsystem 308b (e.g., a CMB). As will be appreciated by one of skill in the art in possession of the present disclosure, the parity data 1314 may be considered as "updated parity data" that is required to update the parity data 802 (e.g., "current parity data") when the primary data 800a (e.g., "current primary data") is updated with the primary data 806 (e.g., "updated primary data") from the host system 202, although other primary data writing scenarios will fall within the scope of the present disclosure as well.

As discussed above, while this simplified example only provides one RAID primary data storage device involved in the primary data update, other RAID primary data storage devices in the RAID data storage system 200 may be involved in the primary data update and may have generated "interim parity data" that was retrieved by the RAID primary data storage device 206B/300. In such situations, one of skill in the art in possession of the present disclosure will recognize that the XOR operations at block 706 may be performed on the current primary data, the updated primary data, the current parity data, and the interim parity data, in order to generate the updated parity data.

Figure 13I:
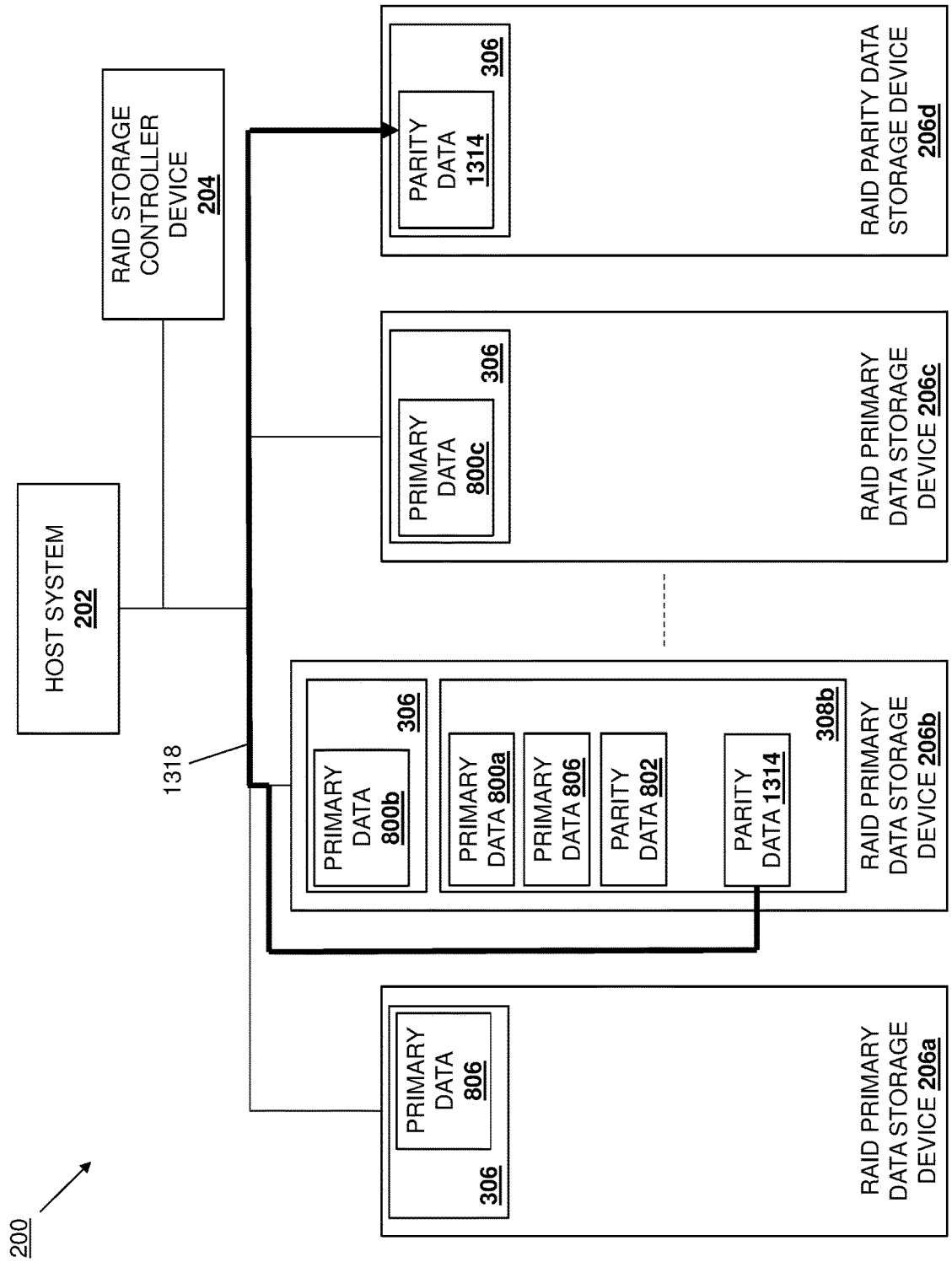
FIG. 13I is a schematic view illustrating an embodiment of the RAID data storage system of FIG. 2 operating during the method of FIG. 6.

The method 700 then proceeds to block 718 where the RAID primary data storage device transmits the updated parity data to the RAID parity data storage device. With reference to FIG. 13I, in an embodiment of block 718 and based on the command 1300 (which is a multi-operation command as described above in this embodiment), the RAID storage engine 304 in the RAID primary data storage device 206b/300 may operate to perform a parity data transmission operation 1318 that transmits the parity data 1314 (e.g., "updated parity data") that is stored on its second buffer subsystem 308b to the RAID parity data storage device 206d, and one of skill in the art in possession of the present disclosure will appreciate how, upon receiving the parity data 1314, the RAID parity data storage device 206d may overwrite the parity data 802 (e.g., "current parity data") in its storage subsystem 306 with the parity data 1314 (e.g., updated parity data").

In one example, the parity data transmission operation 1318 may include the RAID primary data storage device 206b writing the parity data 1314 from its second buffer subsystem 306 to the second buffer subsystem 308b in the RAID parity data storage device 206d, and the RAID parity data storage device 206d overwriting the parity data 802 in its storage subsystem 306 with the parity data 1314 in its second buffer subsystem 308b. However, in another example, the RAID primary data storage device 206b may provide the parity data 1314 directly to the storage subsystem 306 in the RAID parity data storage device 206d using the teachings provided by the inventors of the present disclosure in U.S. patent application Ser. No. 16/838,224, filed on Apr. 2, 2020, the disclosure of which is incorporated herein by reference.

Figure 13J:
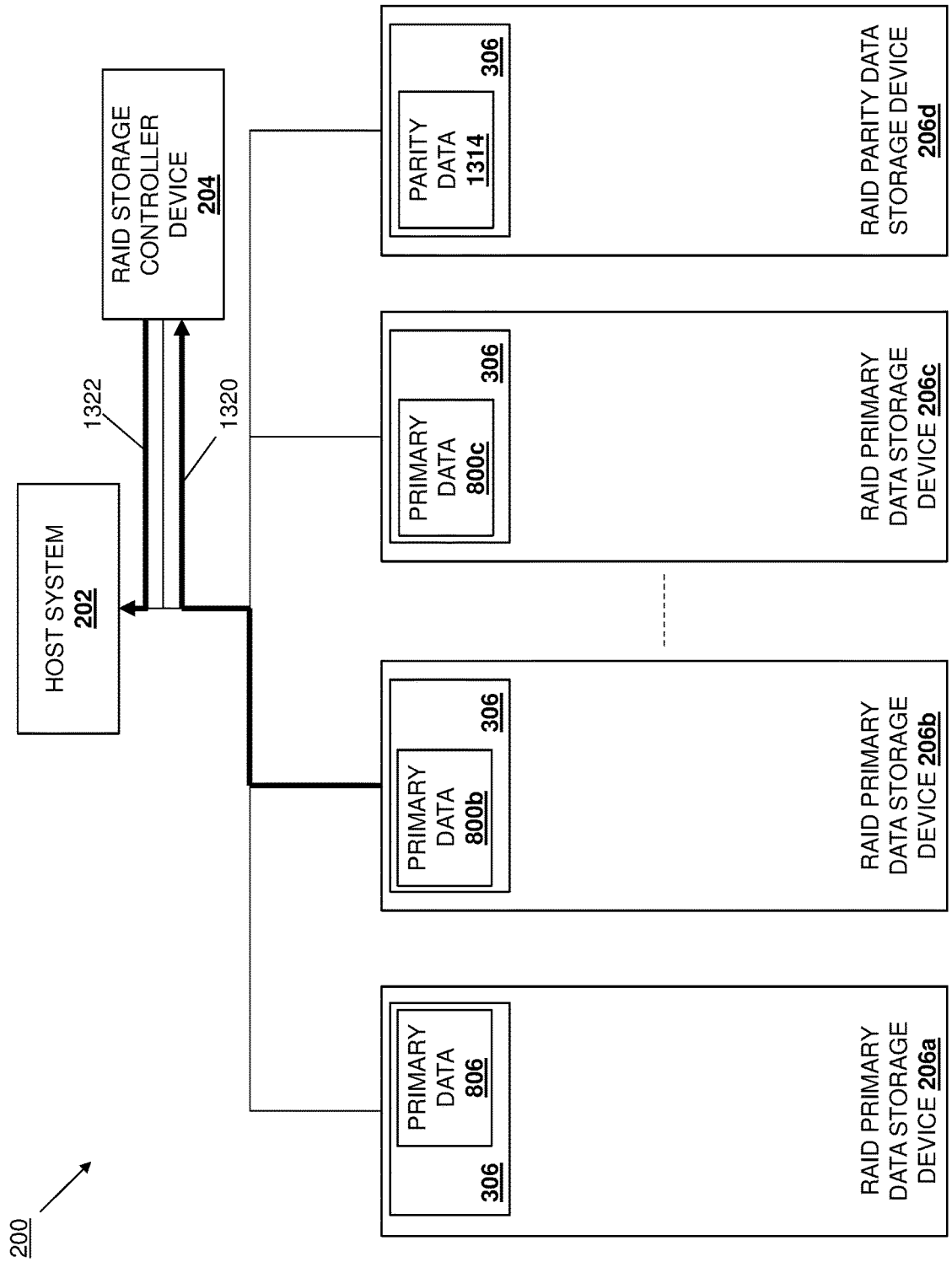
FIG. 13J is a schematic view illustrating an embodiment of the RAID data storage system of FIG. 2 operating during the method of FIG. 6.

With reference to FIG. 13J, following completion of the operations associated with the command 1300 (e.g., multiple operations associated with a multi-operation command as discussed above, following each operation associated with respective commands, etc.) the RAID storage engine 304 in the RAID primary data storage device 206b/300 may generate and transmit a completion message 1320 to the RAID storage controller device 204. For example, the RAID storage engine 304 in the RAID parity data storage device 206b/300 may generate the completion message 1320 and provide that completion message in a completion queue in its communication system 310, and then generate an interrupt to the RAID storage controller device 204 that causes the RAID storage controller device 204 to access that completion queue and retrieve the completion message. However, while a specific technique for transmitting the completion message is described, one of skill in the art in possession of the present disclosure will recognize that completion messages may be transmitted using a variety of other techniques while remaining within the scope of the present disclosure. As also illustrated in FIG. 13J, following the receiving of the completion message 1320, the RAID storage controller device 204 may generate and transmit a completion message 1322 to the host system 202 in order to indicate to the host system that the write command 900 has been completed.

As will be appreciated by one of skill in the art in possession of the present disclosure, the parity data generation offload operations performed by the "proxy" RAID primary data storage device 206b for the RAID parity data storage device 206d offloads those operations from the "over-loaded" RAID parity data storage device 206d, and may provide load-balancing in the RAID storage system 200, particularly when the methods 600 and 700 are performed for many "over-loaded" RAID data storage devices by RAID data storage devices with relatively low loads.

Returning to method 600, if at decision block 610 it is determined that the RAID parity data storage device loading does not exceed the second loading threshold, the method 600 proceeds to block 616 where the RAID storage controller device transmits a parity data generation command. In an embodiment, at block 616, the RAID storage controller device 204 may determine that the relative loading of the RAID parity data storage device 206d and the RAID primary data storage devices is not at a level that calls for parity data generation offload operations and, in response, may generate and transmit a parity data generation command to the RAID parity data storage device 206d. The method 600 then proceeds to block 618 where the RAID parity data storage device performs parity data generation operations. In an embodiment, at block 616 and in response to receiving the parity data generation command, the RAID parity data storage device 206d may perform parity data generation operations.

One of skill in the art in possession of the present disclosure will appreciate that many simplifications have been made in the examples described above in order to provide clarity to that discussion and, as such, other distinctions may be made in selecting a RAID primary data storage device to act as a parity data generating "proxy" by generating updated parity data for a RAID parity data storage device. For example, with regard to the selection of RAID primary data storage devices in the third and fourth groups discussed above (i.e., RAID primary data storage devices that are not involved in the primary data update), in a situation in which RAID primary data storage devices in the third group are all behind a single switch device, and RAID primary data storage devices in the fourth group are behind a different root complex, a RAID primary data storage device that is closest in the Peripheral Component Interconnect (PCI) hierarchy may be selected for acting as the parity data generating proxy. Similarly, RAID primary data storage devices in the third group and in the fourth group, or within either of the third group or fourth group (i.e., RAID primary data storage devices that are not involved in the primary data update), may be different classes of RAID primary data storage devices, and those RAID primary data storage device classes may be used to determine which RAID primary data storage device to select as the parity data generating proxy while remaining within the scope of the present disclosure as well.

Thus, systems and methods have been described that provide a RAID storage controller device that monitors the relative RAID data storage device loading of RAID data storage devices and, in response to a primary data update on a RAID data storage device in a first RAID data storage system, determines whether a RAID parity data storage device in the first RAID data storage system exceeds a first loading threshold relative to RAID primary data storage devices in the first RAID data storage system that are involved in the primary data update. In the event the RAID parity data storage device exceeds a first loading threshold, the RAID storage controller device identifies a RAID primary data storage device that is involved in the primary data update for performing a parity data update for the RAID parity data storage device, and transmits a parity data generation offload command to that RAID primary data storage device that causes the RAID primary data storage device to generate parity data for the primary data update, and provide that parity data to the RAID parity data storage device. If the RAID parity data storage device does not exceed the first loading threshold, the RAID storage controller device determines whether the RAID parity data storage device in the first RAID data storage system exceeds a second loading threshold relative to RAID primary data storage devices in the first RAID data storage system or RAID primary data storage devices in a second RAID data storage system that are not involved in the primary data update. In the event the RAID parity data storage device exceeds the second loading threshold, the RAID storage controller device identifies a RAID primary data storage device that is not involved in the primary data update for performing a parity data update for the RAID parity data storage device, and transmits a parity data generation offload command to that RAID primary data storage device that causes the RAID primary data storage device to generate parity data for the primary data update, and provide that parity data to the RAID parity data storage device. As such, relatively over-loaded RAID data storage devices may have some of their processing operations offloaded to relatively under-loaded RAID data storage devices, thus providing load balancing amongst the RAID data storage devices in RAID data storage system(s).

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Redundant Array of Independent Disks (RAID) parity data generation offload system, comprising:
    a Redundant Array of Independent Disks (RAID) storage controller device that is configured to:
        determine that a RAID parity data storage device loading for a RAID parity data storage device exceeds a loading threshold; and
        generate and transmit a RAID parity data generation offload command associated with a RAID parity data update required in response to a RAID primary data update; and
    a first RAID primary data storage device that is coupled to the RAID storage controller device and that is configured to:
        receive, from the RAID storage controller device, the RAID parity data generation offload command;
        retrieve, from the RAID parity data storage device, current parity data;
        perform an XOR operation using the current parity data, current primary data, and updated primary data associated with the RAID primary data update in order to generate updated parity data; and
        provide the updated parity data for storage on the RAID parity data storage device in place of the current parity data.

2. The system of claim 1, wherein the current primary data is stored in the first RAID primary data storage device.

3. The system of claim 2, wherein the first RAID primary data storage device is configured to:
    retrieve, from a host system, the updated primary data;
    store the updated primary data; and
    overwrite, following the performance of the XOR operation to generate updated parity data, the current primary data with the updated primary data.

4. The system of claim 1, wherein the current primary data is stored in a second RAID primary data storage device, and the updated primary data is stored in the second RAID primary data storage device.

5. The system of claim 4, wherein the first RAID primary data storage device is configured to:
    retrieve, from the second RAID primary data storage device, the current primary data;
    store the current primary data;
    retrieve, from the second RAID primary data storage device, the updated primary data; and
    store the updated primary data.

6. The system of claim 4, wherein the first RAID primary data storage device is included in a first RAID data storage system, and wherein the second RAID primary data storage device and the RAID parity data storage device are included in a second RAID data storage system that is different than the first RAID data storage system.

7. The system of claim 1, wherein the RAID parity data storage device loading for the RAID parity data storage device exceeds the loading threshold by including a number of RAID parity data storage device commands in a RAID parity data storage device command queue that include a total RAID parity data storage device command execution time that is a threshold percentage greater than a total first RAID primary data storage device command execution time of first RAID primary data storage device commands in a first RAID primary data storage device command queue of the first RAID primary data storage device.

8. An Information Handling System (IHS), comprising:
    a processing system; and
    a memory system that is coupled to the processing system and that includes instructions that, when executed by the processing system, cause the processing system to provide a RAID data storage engine that is configured to:
        receive, from a RAID storage controller device, a RAID parity data generation offload command that is associated with a RAID parity data storage device having a RAID parity data storage device loading that exceeds a loading threshold;
        retrieve, from the RAID parity data storage device, current parity data;
        perform an XOR operation using the current parity data, current primary data, and updated primary data associated with the RAID primary data update in order to generate updated parity data; and
        provide the updated parity data for storage on the RAID parity data storage device in place of the current parity data.

9. The IHS of claim 8, further comprising:
    a storage subsystem that is coupled to the processing system, wherein the current primary data is stored in the storage subsystem.

10. The IHS of claim 9, further comprising:
    a buffer subsystem that is coupled to the processing system, wherein the RAID data storage engine is configured to:
        retrieve, from a host system, the updated primary data;
        store the updated primary data in the buffer subsystem; and
        overwrite, following the performance of the XOR operation to generate updated parity data, the current primary data in the storage subsystem with the updated primary data in the buffer subsystem.

11. The IHS of claim 8, wherein the current primary data is stored in a RAID primary data storage device, and the updated primary data is stored in the RAID primary data storage device.

12. The IHS of claim 11, further comprising:
    a buffer subsystem that is coupled to the processing system, wherein the RAID data storage engine is configured to:
        retrieve, from the second RAID primary data storage device, the current primary data;
        store the current primary data in the buffer subsystem; and
        retrieve, from the second RAID primary data storage device, the updated primary data; and store the updated primary data in the buffer subsystem.

13. The IHS of claim 8, wherein the RAID parity data storage device loading for the RAID parity data storage device exceeds the loading threshold by including a number of RAID parity data storage device commands in a RAID parity data storage device command queue that include a total RAID parity data storage device command execution time that is a threshold percentage greater than a total RAID primary data storage device command execution time of RAID primary data storage device commands in a RAID primary data storage device command queue that is accessible to the processing system.

14. A method for offloading parity data generation from a RAID parity data storage device, comprising:
    receiving, by a first RAID primary data storage device from a RAID storage controller device, a RAID parity data generation offload command that is associated with a RAID parity data storage device having a RAID parity data storage device loading that exceeds a loading threshold;
retrieving, by the first RAID primary data storage device from the RAID parity data storage device, current parity data;
performing, by the first RAID primary data storage device, an XOR operation using the current parity data, current primary data, and updated primary data associated with the RAID primary data update in order to generate updated parity data; and
providing, by the first RAID primary data storage device, the updated parity data for storage on the RAID parity data storage device in place of the current parity data.

15. The method of claim 14, wherein the current primary data is stored in the first RAID primary data storage device.

16. The method of claim 15, further comprising:
retrieving, by the first RAID primary data storage device from a host system, the updated primary data;
storing, by the first RAID primary data storage device, the updated primary data; and
overwriting, by the first RAID primary data storage device following the performance of the XOR operation to generate updated parity data, the current primary data with the updated primary data.

17. The method of claim 14, wherein the current primary data is stored in a second RAID primary data storage device, and the updated primary data is stored in the second RAID primary data storage device.

18. The method of claim 17, further comprising:
retrieving, by the first RAID primary data storage device from the second RAID primary data storage device, the current primary data;
storing, by the first RAID primary data storage device, the current primary data;
retrieving, by the first RAID primary data storage device from the second RAID primary data storage device, the updated primary data; and
storing, by the first RAID primary data storage device, the updated primary data.

19. The method of claim 17, wherein the first RAID primary data storage device is included in a first RAID data storage system, and wherein the second RAID primary data storage device and the RAID parity data storage device are included in a second RAID data storage system that is different than the first RAID data storage system.

20. The method of claim 14, wherein the RAID parity data storage device loading for the RAID parity data storage device exceeds the loading threshold by including a number of RAID parity data storage device commands in a RAID parity data storage device command queue that include a total RAID parity data storage device command execution time that is a threshold percentage greater than a total first RAID primary data storage device command execution time of first RAID primary data storage device commands in a first RAID primary data storage device command queue of the first RAID primary data storage device.

* * * * *